United States Patent [19]
Bonneau et al.

[11] Patent Number: 5,870,502
[45] Date of Patent: Feb. 9, 1999

[54] SYSTEM AND METHOD FOR A MULTIRESOLUTION TRANSFORM OF DIGITAL IMAGE INFORMATION

[75] Inventors: Robert J. Bonneau; Henry E. Meadows, both of New York, N.Y.

[73] Assignee: The Trustees of Columbia University in the City of New York, N.Y.

[21] Appl. No.: 629,237

[22] Filed: Apr. 8, 1996

[51] Int. Cl.[6] .............................. G06K 9/36; G06K 9/46
[52] U.S. Cl. ...................... 382/249; 382/240; 348/397; 348/420
[58] Field of Search ................................. 382/248, 249, 382/240, 191, 232–233; 358/433; 348/398, 403, 420, 438, 397

[56] References Cited

U.S. PATENT DOCUMENTS

| | | | |
|---|---|---|---|
| 5,065,447 | 11/1991 | Barnsley et al. | 382/232 |
| 5,347,600 | 9/1994 | Barnsley et al. | 382/232 |
| 5,398,067 | 3/1995 | Sakamoto | 348/403 |
| 5,416,856 | 5/1995 | Jacobs et al. | 382/232 |
| 5,454,051 | 9/1995 | Smith | 382/233 |
| 5,497,435 | 3/1996 | Berger | 382/249 |
| 5,510,838 | 4/1996 | Yomdin et al. | 348/384 |
| 5,537,493 | 7/1996 | Wilkinson | 382/240 |
| 5,577,134 | 11/1996 | Westerink | 382/240 |
| 5,600,373 | 2/1997 | Chui et al. | 348/397 |
| 5,604,824 | 2/1997 | Chui et al. | 382/248 |

OTHER PUBLICATIONS

Circuits and Systems, 1994 IEEE International Symposium, vo. 3, 1994, R. Rinaldo et al. "An Improved Wavelet–Fractal Coder," pp. 113–116.

Wen–Liang Hwang and Stephane Mallet, "Characterization of Self–Similar Multifractals with Wavelet Maxima", Technical Report 641, Corant Institute of Mathematical Science, Jul. 1993; and.

A. Arnedo, E Bacry and J.F. Muzy, "The Thermodynamics of Fractals Revisted with Wavelets", Physica A 213, pp. 232–275, (1995).

A. Bogdan, "The Fractal Pyramid with Applications to Image Coding", Proceedings of the IEEE Conf. ICASSP–95, Detroit, MI.

G. Davis; "Adaptive self–quantization of wavelet subtrees: a wavelet–based theory of fractal image compression"; SPIE Conference at Mathematical Imaging: Wavelet applications.

M. Hilton et al.; "Compressing Still and Moving Images with Wavelets"; Multimedia Systems, vol. 2, No. 3, Apr. 18, 1994.

A. Jaquin; "Image coding based on a fractal theory of iterated contractive Markov operators: Part II, Construction of fractal codes for digital images", Georgia Institute of Technology, PhD Dissertation, Aug. 1989.

A. Jacquin; "Fractal Image Coding: A Review"; Proceedings of the IEEE, vol. 81, No. 10, Oct. 1993, pp. 1453–1463.

(List continued on next page.)

*Primary Examiner*—Leo H. Boudreau
*Assistant Examiner*—Bhavesh Mehta
*Attorney, Agent, or Firm*—Baker & Botts, LLP

[57] ABSTRACT

Digital image data is encoded and compressed by a technique which combines the advantages of both wavelet and fractal encoding. The technique produces an encoded image which can be efficiently matched to other compressed images in order to identify the image being processed. The encoding technique spatially decimates the images at numerous frequency scales produced by wavelet transformations and forms blocks comprising of groups of pixels at each frequency scales. The average modulus values and average angle values of the data in each of the blocks are compared to the next higher scale. Each frequency scale is then encoded for the blocks which have corresponding matching blocks in the adjacent scale. The technique provides the edge retention benefits of wavelet and the compression benefits fractal encoding and also accelerates the matching process between the scales. A decoding technique which includes a synthetic edge procedure is used to reconstruct the image. Video encoding can also be done using a variation of the encoding technique.

40 Claims, 17 Drawing Sheets

OTHER PUBLICATIONS

H. Krupnik, D. Malah and E. Karnin; "Fracal Representation of Images via the Discrete Wavelet Transform"; IEEE 18th Conv. of EE in Isreal, Tel–Aviv, Mar. 1995.

S. Mallat and S. Zhong; "Characterization of Signals from Multiscale Edges"; IEEE Transactions on Pattern Analysis and Machine Intelligence, vol. 14, No. 7, Jul. 1992, pp. 710–732.

S. Pei, C. Chien–Cheng Tseng and C. Lin; "Wavelet Transform and Scale Space Filtering of Fractal Images"; IEEE Transactions on Image Processing, vol. 4, No. 5, May 1995, pp. 682–687.

R. Rinaldo and G. Calvango; "Image coding by block prediction of multirsolution subimages"; IEEE Transactions on Image Processing, vol. 4, No. 7, Jul. 1995, pp. 909–920.

J. Storer, editor, "Fractal Image Compression Using Iterated Transforms", Image and Text Compression, Kluwer Academic Publishers, pp. 35–61.

V. Sundareswaran and Stephane Mallat; "Multiscale Optical Flow Computation with Wavelets", Courant Institute of Mathematical Sciences, New York University.

A. Van De Walle; "Merging Fractal Image Compression and Wavelet Transform Methods"; University of Waterloo, Canada, Internet address: http: ‖links.uwaterloo.ca:80/(avd); Aug. 17, 1995.

| $P_3$ | $P_2$ | $P_9$ |
|---|---|---|
| $P_4$ | $P_1$ | $P_8$ |
| $P_5$ | $P_6$ | $P_7$ |

SYSTEM AND METHOD FOR A MULTIRESOLUTION TRANSFORM OF DIGITAL IMAGE INFORMATION

The United States Government has certain rights in this invention as provided by the terms of Contract No. CDR-88-11111 granted by the National Science Foundation.

FIELD OF THE INVENTION

The present invention relates in general to digital image processing and, in particular, to a system and method for applying a multiresolution transform to a digital image for compression encoding and decoding of the image information, pattern recognition and video image processing.

BACKGROUND OF THE INVENTION

Digital image processing is an important area of advancement in the field of computer science with many current applications and an increasingly growing number of potential applications. The subject of digital image processing includes the storage, analysis and communication of images which are represented in the digital domain by a series of bits or bytes corresponding to each point in an image. A typical example of a digital image is one that appears on a screen of a computer. The screen consists of a number of monochrome or colored picture elements ("pixels"), each of which have associated binary values which determine if the pixel should be illuminated (and in some cases how bright it should be illuminated). The simplest case is where each pixel has one bit of data associated with it on a black and white screen. If the pixel is lit, then the value of the bit is set to one. If the pixel is not lit, then the binary value is set to zero. Each pixel could instead have a byte (8 bits) of data representing either the distinct color, particular shade of grey or some other information. A typical screen could have an array of 520 by 480 pixels to display an image. In order to store one complete screen containing an image where each pixel has a corresponding byte of data to it, approximately two megabits of data would have to be used for this example (520×480). More pixels are used in higher resolution screens which are becoming more and more popular today.

In order to store a large number of single images in a database for storage and processing, a data compression technique is required to make managing the database efficient and feasible for operating in real time. In addition to on-site applications with digital images, digital images can be transmitted to an outside site either via a network, dedicated line or some other type of conduit of data. In order to increase the efficiency of data transmission and represent images which will fit in the bandwidth of the data conduit, the data must be also compressed. An imaging device for recording images such as a digital camera could be placed at a remote location, have the image data digitally processed and compressed at the remote location, transmit the compressed data to a central processing station or other final destination location, and decode the image information so that an operator at the final location can view the image. The decoded image could also be matched against a database of stored images for identification purposes. If the database contained many records of images to be matched, the images stored in the database would need to be compressed in order for the database to hold and process the required number of images for a particular application. Accelerated pattern matching may be required for potential applications such as identifying a criminal caught on a bank's videotape where batch processing for storage and transmission purposes of the matching operation could take up to several hours due to the vast size of the database.

While the compression of image information is necessary for pattern matching, some conventional compression techniques can lose important image information in the process of compressing the data. An important aspect of a pattern matching technique is to be able to preserve the essential features of an object, such as their edges. The physical differences in the objects of the images could be very slight and there may be many similar objects stored in a database to be distinguished and matched. An example is a database of people who work for a large company or live in a small town. The pattern matching technique could be used to identify persons at an entrance gate but would have to account for small difference in facial features in order to distinguish the people. The use of digital images of faces in a database is currently being used for storage. In New York State and other states, the pictures on driver's licenses are digital images which are stored and be reproduced if a license is lost. The next step is to match images of people captured on cameras at crime scenes to the driver's license database of physical images to identify the criminal. Digital images of fingerprints or other objects could also be used. Pattern recognition of images should not be limited to objects in the exact same position because objects are not always still, but the recognition technique should allow objects to be rotated and placed in any position when pattern matching.

Digital image processing also includes video processing. Video is basically a time series of single images (called frames). Each image frame when shown sequentially over time shows movement in the objects present in an image. Video image data can also be stored and replayed. One example of digital video images is the video clips that appear in popular software programs. These video clips can include clips from movies which have been digitally recorded or clips recorded by a camera and stored digitally in the computer. Video images can also be transmitted over long distances. One example is a teleconferencing which shows the image of the speaker while talking at a remote location and shows the speaker's movement or expression.

Video images require a large amount of data to represent just a few seconds of video time. Each individual frame of the video must be stored and replayed to create a recognizable video image. Even if only a portion of the frames are stored, the sheer number of frames requires the image data be compressed. Video images can also be used in pattern matching schemes which could identify particular objects in the video images. This may allow an air traffic controller to identify planes if other communication systems fail.

From the above discussion, a digital image encoding scheme is desired which has a high compression ratio while still preserving the feature's important details such as its edges.

One compression scheme currently in use is called "fractal encoding". Fractal encoding takes advantage of the fact that many subparts of an image are repeated and therefore an image can be represented by a mapping of the portions of the image to only a fraction of the subparts of the image (called blocks). By mapping the image onto pieces of itself, a separate code book and word relating parts of an image to other objects does not need to be stored. Fractal encoding subdivides an image to be encoded into blocks which taken as a whole make up the entire image. Some of the blocks may overlap and be different sizes. In conventional fractal encoding, the image is divided into two sets of blocks. The first set is the domain blocks which will be compared with second set of blocks called range blocks. The domain blocks can be rotated and have mirror images created in order to create more choices of domain blocks which can be compared against the range blocks. Each domain block is compared to each range block to determine the closest match. The mapping of the domain blocks to the range blocks is stored. Only information regarding matching blocks is used and the remaining blocks may be discarded thus compressing the data.

Fractal encoding does generate high compression ratios relative to other known compression schemes. A compression ratio is defined as the number of bits in the original image to the number of bits in the compressed image. However, images which have been fractally encoded tend to produce blocky artifacts when reconstructed and decompressed. This is due to the data being organized in blocks. The fine edge information which is required by advanced pattern recognition systems is not satisfied by only using a block matching fractal encoding scheme.

Another technique for compressing digital image information is wavelet edge detection. Wavelet compression techniques exploit the fact that images have spatial and spectral redundancies which can be eliminated to reduce the size of the data structure used to represent the image. In simple terms, wavelets transform an image signal into a set of basis functions, much like the application of a Fourier transform which uses sines and cosines as a basis set. When the set of basis functions is applied, the original image is transformed into a set of coefficients. These coefficients can be further transformed when a derivative or gradient operator is applied to the basis set. The coefficients then take the form of edges in different frequency bands or scales which allows for an efficient means of image and video compression.

Wavelet transformations produce frequency scales which decrease in resolution as the scales increase. The wavelet transform, when applied with a gradient operator, can remove texture from the image resulting in decreased reproduction quality. It would be beneficial to combine the compression qualities of fractal encoding with the shape preserving qualities of the wavelet encoding techniques.

Some techniques have been recently developed using aspects from both fractal and wavelet techniques. These techniques focus on taking fractal compression techniques which are traditionally applied in a spatial domain, and applying them in the wavelet domain instead. However, these techniques do not take full advantage of spatial similarities revealed by the gradient operator in the fractal portion of the technique, and thus lose image quality as the compression ratio for the technique increases.

SUMMARY OF THE INVENTION

In accordance with the present invention, there is provided a system and method for processing digital image data by encoding the data to gain high compression while retaining important edge information, for decoding compressed image information which has been encoded, for matching objects within an image field to objects stored in a database and for encoding and decoding video digital images. The encoding method combines the benefits of the conventional wavelet and fractal encoding schemes in a unique way to take full advantage of both schemes. The encoding technique first spatially decomposes the image data into initially two frequency scales by a wavelet transformation. The wavelet transformation uses a quadratic spline basis set which enhances edges. At each frequency scale, a low frequency and a high frequency image is generated during the wavelet transformation. The high frequency image thresholds out coefficients below a certain grey scale level. The high frequency point representations are then divided into blocks, where the higher frequency (lower scale) representations are called range blocks and the next higher scale blocks are called domain blocks. The average modulus and angle values of each range and domain block are then calculated and recorded. The gradient direction values are then sorted independently for range and domain blocks and compared to find the closest values. If the closest match does not exceed a given threshold value, the block positions and modulus difference intensity and angle values are stored in a file to represent that portion of the image. If the closest match exceeds a threshold, another frequency scale is used. The unmatched domain blocks now become the range blocks in the next frequency scale for the new domain blocks in the just created frequency scale. When all the blocks have been matched at levels below the threshold, the process is complete. The low frequency image of the scale which had the last matching domain blocks is spatially decimated and stored.

The encoded image can be decoded using a decoding technique in accordance with the invention. First the low frequency image of the highest scale is decoded. The high frequency image of that same scale is then also decoded. The low frequency and high frequency images are then transformed to the next higher frequency scale (lower scale number) and added together. This produces the low frequency image of the next scale. The process of decoding the high frequency image of the scale and transforming the images to the next scale is repeated until the image is reconstructed.

Further removal of any blocking artifacts may be achieved by using a synthetic edge procedure in which chain coding is first performed on the fractal reproduced edge of the image. If the trajectory of the chain coded edge runs over the next fractal coded block in the chain, a bounding region of twice the range block size is created around the point at which the bounding chain coded block runs over the block boundary. An edge thinning algorithm is then applied to the bounding region, and thereafter the chain coding is resumed at the center of the fractal coded edge block that intersects the bounding rectangle.

The encoded data processed in accordance with this invention is very useful in pattern matching/recognition schemes. The stored data of the encoded data can be chain coded around the edges of objects in the image which helps identify distinct objects. The object can then be matched across the frequency scales to determine the hardest edges. Noise can be removed and the edge information can be compared to a database of encoded edge information for identification. The edge retention feature of the invention allows for precise matching and increased compression.

Video encoding is a very efficient process when performed in accordance with the invention. Video is made of a series of frames, each of which is a digital image. The first frame is encoded with the image encoding scheme of the invention. The optical flow is then calculated between the first frame and the next frame. The average optical flow of the range and domain blocks is then calculated. If the changes to the image are large enough for a particular range or domain block (found by comparing the average optical flow to a threshold), that block will be recomputed to correspond to the new image portion. Only those portions of the image which have changed will be affected. The new domain and range blocks in compressed form are then transmitted or stored to reflect the current state of the image being processed. If a large number of blocks are changed, the entire next frame will be encoded in order to minimize error in the image.

BRIEF DESCRIPTION OF THE DRAWING

Further objects, features and advantages of the invention will become apparent from the following detailed description taken in conjunction with the accompanying figures showing a preferred embodiment of the invention, in which.

DESCRIPTION OF A PREFERRED EMBODIMENT

The present invention is directed to a system and method for encoding and compressing digital image information which achieves high compression, has selective and accurate feature preservation and is computationally efficient. Once the image information is encoded and compressed in accordance with the invention, a further technique is described which can closely reproduce the original image from the compressed data which could have been transmitted or stored. The encoding technique also allows for very efficient pattern matching of digitally represented objects within the image which is further described below. Finally, the encoding technique can be adapted to video images for image compression and shape recognition in the video images. The encoding scheme of the present invention combines elements of both traditional fractal encoding and wavelet encoding techniques in a unique way to take advantage of the strengths of both these techniques. The primary technique for encoding image information will be described first. Subsequently, the specific techniques all based on the encoding technique for decoding, shape recognition and video encoding will be described.

Figure 1:
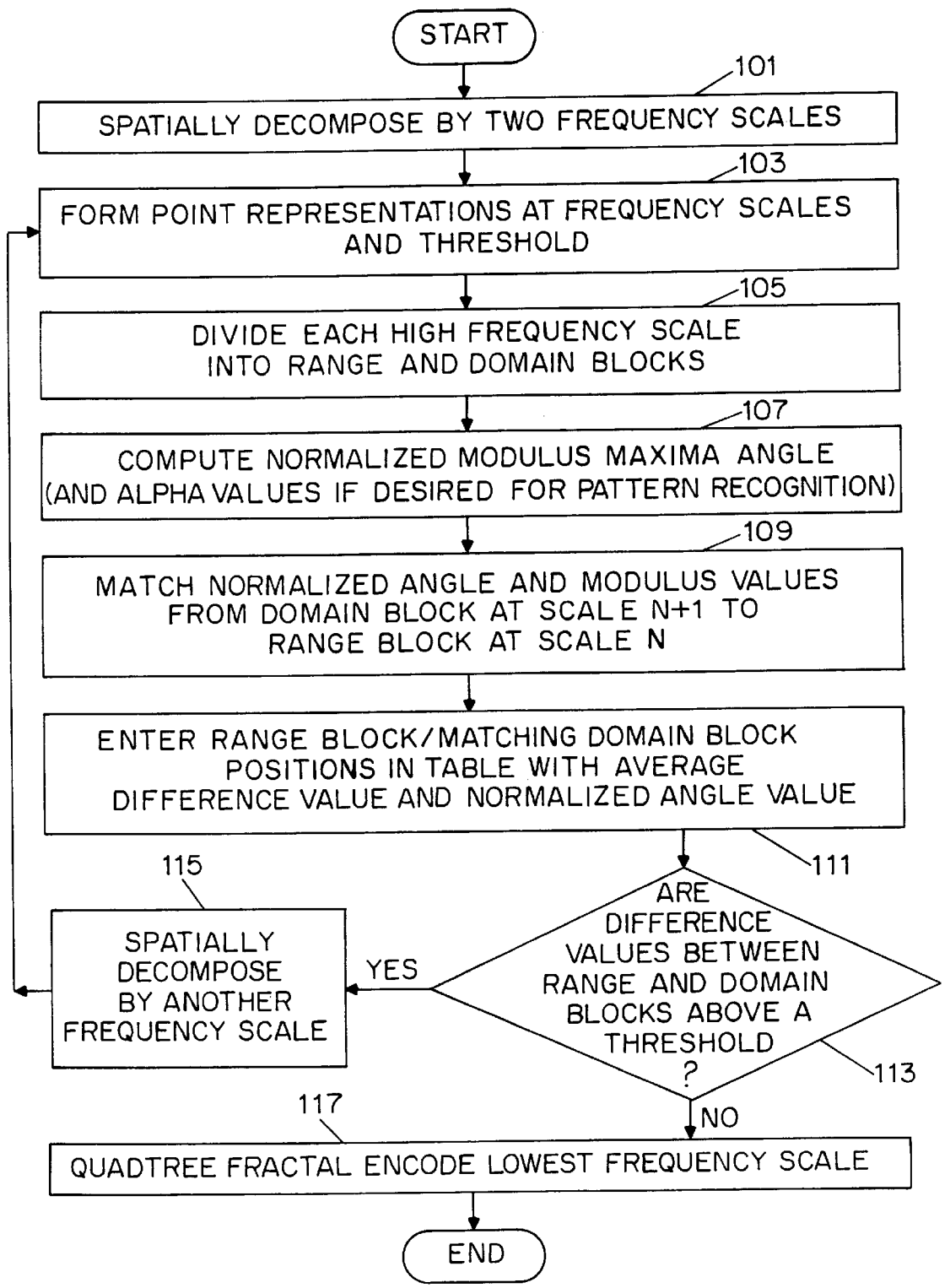
FIG. 1 is a flow chart of the steps for encoding image data in accordance with the invention.

FIG. 1 shows a flow chart of the steps involved to perform the image encoding technique in accordance with the invention. The encoding process compresses the data representing the image so that the information can be more easily transmitted or stored in a storage medium. The compression ratio currently achieved for the technique is 35:1 (every thirty five bytes of data and be represented by one byte of compressed data) with a level of noise of about (30 dB PSNR (peak signal to noise ratio)). The noise is the difference between the original image before encoding and the reproduced image. The data representing the compressed image (or identified objects in an image) allows for faster shape recognition because of its reduced size and allows for greater storage of compressed images which can be used for future pattern matching. The following technique for encoding image information is typically performed on a conventional representation of an image made up of pixels, or picture elements. An image field is the entire image being processed which may be made of numerous objects located on a background. Thus an image could be made of a 1000 by 1000 grid of pixels when 10% of the pixels near the center of the grid constitute an object. A desired image portion to be stored in an image field can be made of multiple objects such as three circles in a stop light. Therefore, an image of a stoplight will be made up of three circle objects and a rectangle object. An example of the encoding technique applied to a specific image will be shown in subsequent figures.

Step 101 in FIG. 1 spatially decomposes the image to be encoded into a first and second frequency scale using a standard two dimensional wavelet transformation. Wavelet transformations will identify edge information by taking the derivatives of an (x,y) point of a smoothing function which will be applied to the image data of the image to be transformed and thereafter computing the modulus maximum (largest amount and intensity of information at the point) which indicates the presence of edges in the image. The start of the encoding is described by the following equations 1 to 3:

$$\psi^1(x, y) = \frac{\partial}{\partial x} \theta(x, y) \tag{1}$$

$$\psi^2(x, y) = \frac{\partial}{\partial y} \theta(x, y) \tag{2}$$

$$\psi_s^1(x, y) = \frac{1}{s^2} \psi\left(\frac{x}{s}, \frac{y}{s}\right) \quad (3)$$

Equations 1 and 2 are the gradients of the smoothing function (θ) in either the x or the y directions.

The present invention uses a quadratic spline basis set for the wavelet encoding. The quadratic spline basis set allows for greater edge information to be retained by the wavelet due to its characteristics. The quadratic spline basis has not been previously used in a combined wavelet-fractal transformation. Most fractal-related wavelet techniques use a simple Haar basis set which is easy to implement in a fractal encoding scheme dealing with blocks as representations but does not retain great amounts of edge information. The Haar basis set consists of a sync function in the frequency domain or block functions in the spatial domain. The use of a quadratic-spline basis set when combining wavelet and fractal techniques allows edge shape information in the wavelet domain to be better revealed for more accurate fractal block matching.

$\psi_s^1$ is the derivative of the smoothing function at each scale s, where s contracts the function corresponding to a spatial decimation of space. $\psi_s^2$ is the y derivative of the smoothing function at each scale s. S is usually a power of 2. In the first pass of the technique, the gradient scale is two. This means the image will be spatially decimated by 2 in both the x and y direction. In each of any subsequent frequency scales, the gradient scale will the next power of two, i.e., 4 ($2^2$) for the second pass, 8 ($2^3$) for the third pass and so on. Next, the image f is convolved with the smoothing function where f is the function representing the image.

$$W_s^1 f(x,y) = f \otimes \psi_s^1(x,y) \quad (4)$$

$$W_s^2 f(x,y) = f \otimes \psi_s^2(x,y) \quad (5)$$

$W_s^1$ and $W_s^2$ are the wavelet transform functions in the x and y directions.

After computing the wavelet transform of the image to be encoded for a particular scale using the wavelet transformation function, the wavelet image will be divided into a number of sub-regions or blocks. The blocks will contain a certain number of pixels N×N, usually a power of 2 corresponding to the wavelet scale. The modulus and gradient angle for each (x,y) pixel in each frequency scale is first calculated. The calculations are computed as described is Equations 6 and 7:

$$M_s f(x, y) = \sqrt{|W_s^1 f(x, y)|^2 + |W_s^2 f(x, y)|^2} \quad (6)$$

$$A_s f(x, y) = arg(W_s^1 f(x, y) + i W_s^2 f(x, y)) \quad (7)$$

The modulus is the amount of image power stored in the group of pixels for a given scale and gradient angle shows the derivative of an edge if present.

Step 103 then forms a point representation at the selected frequency scales of the image based on those points whose modulus value exceeds a predefined value. For the first iteration of the technique, two frequency scales will have point representations, designated scale numbers one (where S=2) and two (where S=4). The point representation will be used in the fractal portion of the technique. When a wavelet transformation is applied to an image, two representations of the image are created. The first representation, termed high frequency image, contains all the pixels with modulus when that exceeds a certain threshold. The second representation, termed low frequency image, contains the pixels with low modulus values. The low intensity modulus values correspond to the texture or grain of the picture and the high modulus values correspond to the edges, or more distinct features. The high frequency image information will have fewer data points because only those pixel exceeding a threshold will be retained. Thus any empty space in an image will be removed saving space in the data representation.

Step 105 then divides the high frequency image in the frequency scale N into range and the high frequency scale from N+1 into domain blocks. The size of the domain and range blocks will affect the PSNR (peak signal to noise ratio) and compression ratio in the resultant reproduced image. The more domain blocks which are generated, the lower the PSNR thus producing a cleaner image but the compression will be reduced. An effective quadtree segmentation is used to subdivide the high frequency image of the lower of the two scales into the range blocks since the wavelet basis set of the lowest scale includes all of the other frequency scales. If the amount of image data in a range block is greater than a predefined threshold level, then the range block will be further subdivided so that the modulus in a particular range block will never exceed the threshold level.

Step 107 computes the normalized modulus maxima and normalized angle for each domain and range block generated in step 105. At this point in the technique, the Lipschitz exponent of the wavelet transform can also be computed if desired for later pattern recognition. The Lipschitz exponent will be explained fully in the pattern recognition section subsequently. The normalized modulus and angle values are computed by the following equations:

$$\hat{m}_{2j} = \frac{\sum_{k=1}^{N} \sum_{l=1}^{N} M_{sj} f(k, l)}{Norm} \quad (8)$$

$$\hat{a}_{2j} = \frac{\sum_{k=1}^{N} \sum_{l=1}^{N} A_{sj} f(k, l)}{Norm} \quad (9)$$

The calculated normalized value $\hat{m}_2$; and $\hat{a}_2$; are the average of the non-zero modulus or angle values, respectively, for a block at scale j. The "Norm" variable in equations 8 and 9 is the number of non-zero pixels in a given domain or range block. The normalized modulus and angle information is calculated for the range blocks of the scale N and for the domain blocks of scale N+1. The normalized average modulus and angle information are stored in a compressed image file which will be described in greater detail in FIG. 9.

Step 109 then matches the normalized angle and modulus values from each domain block in the image to be encoded at scale n+1 to each range block at scale n, where n is the current scale to be encoded. Thus the first iteration of the technique has the range blocks at scale one and the domain blocks at scale two. The second iteration would have the range blocks at scale two and the domain blocks at scale three. The average norm angle and the average modulus value for all the domain and range blocks are separately sorted by angle value and modulus value and then compared in a look up table. By sorting the normalized average values of modulus and angle, each block of the domain blocks does not have to be compared individually to each range block which is done in conventional fractal encoding. By comparing the modulus and angle values in pre-classified sorted order, a large savings in computing time can be accomplished which yields a sizable increase in efficiency of the encoding scheme.

Step 111 checks if the difference between the normalized modulus maxima and angle for a particular domain block to the closest range block is above a predefined threshold. The difference value is an excellent measure of how similar a domain block is to a range block. Because the modulus and angle values are sorted, determining the closest range block is a relatively fast process. The differences are calculated by the following equations:

$$m\text{dif}=|\hat{m}_{2^j-1}-\hat{m}_{2^j}| \tag{10}$$

$$a\text{dif}=|\hat{a}_{2^j-1}-\hat{a}_{2^j}| \tag{11}$$

If the minimum difference value between a particular domain block and the range blocks is above predefined threshold, then the range block does not match sufficiently to the domain blocks of the next higher scale, and another higher frequency scale must be used for proper encoding for that particular range block. If at least one domain block has a high minimum difference value, then a further frequency scale must be generated. If the difference value for a domain block is below the threshold, then the present scale is sufficient to compress and preserve the image to the desired level and the data for that range and domain block will be recorded in step 111.

Step 111 enters the domain block/matching range block locations in a table in a file along with the average difference value between the blocks and the normalized angle value of the range blocks for the range blocks which had a minimum difference value below the predefined threshold when compared. An example of the table generated is shown and explained in conjunction with FIG. 9. The values stored in the file will be a compressed representation of the original image which can be later decompressed after transmission or storage, can be used for efficient pattern matching, or can be used as part of video compression.

Step 113 checks if the minimum difference values between the domain and range blocks exceed the threshold for a given block. If it does, the technique continues with step 115 to obtain range and domain blocks at higher scales which are similar. As the scale increases and resolution of the range decreases, it becomes easier to find matching blocks.

Step 115 spatially decomposes the image information at the next higher frequency scale. In this preferred embodiment, the scale will be increase by a factor of two. The low frequency image of the higher scale will then be spatially decimated by a factor of two. Thus if the first scale were decimated by two, the second scale would be decimated by four and the third scale would be decimated by eight. The scale determines the resolution and amount of spatial decimation of the image. The process continues with step 103 where the range blocks are from the high frequency image which where previously the domain blocks and the domain blocks come from the newly generated scale. Step 117 fractally encodes the low frequency image of the scale whose domain blocks when encoded. The encoding is done with standard fractal encoding techniques. The domain blocks of the lowest frequency information and domain blocks are matched together to allow for further compression of the wavelet representations. Alternatively, the low frequency image could be spatially subsampled in order to compress its image.

Figure 2:
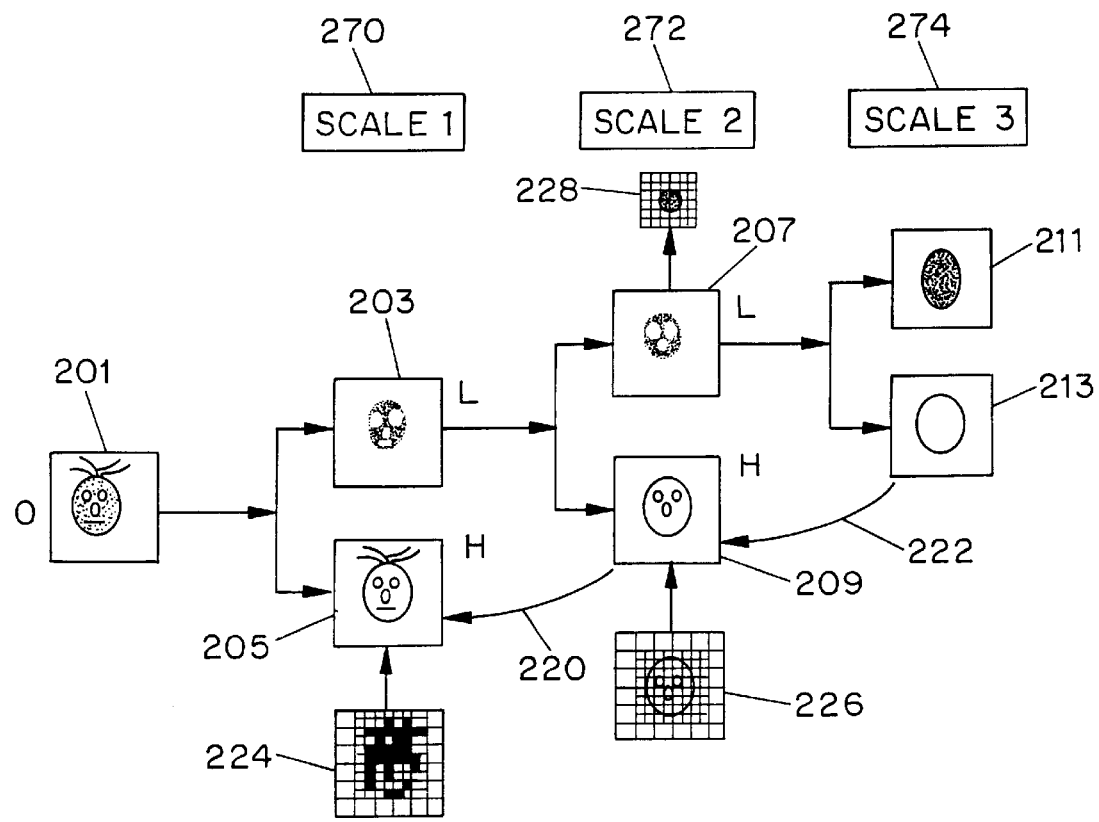
FIG. 2 is a graphical representation of the encoding process of FIG. 1 applied to an original image.
Figure 2:
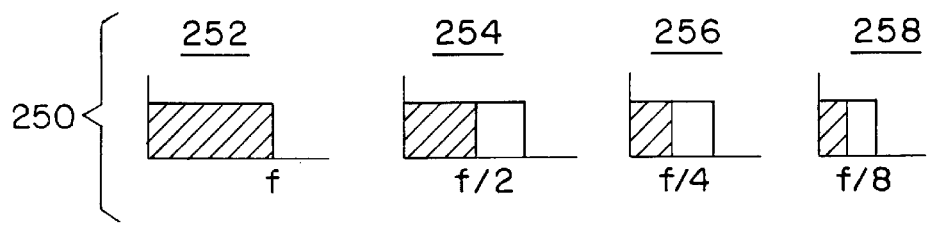

FIGS. 2–6 are graphical representations of applying the encoding technique described in FIG. 1 to an original unencoded image which is to be encoded and compressed. FIG. 2 shows an original image and the intermediate processing steps performed during encoding. In this example, three frequency scales were generated during the multiresolution transform of the image. Labels 270, 272 and 274 show the scale numbers in the figure. Box 201 represents the original image before encoding. The image of box 201 in this example is a face with eyes, nose, mouth and hair. The shaded portion of the image represents the texture of the face which would be present in a normal image such as a photograph or drawing. Box 203 represents the low frequency scale "one" (first frequency scale) image after the image has been wavelet encoded at the first frequency scale. The wavelet encoding divides the frequency components in the image in half and generates low frequency scale one image 203 and high frequency scale one image 205. The high frequency scale one image contains the most edge information. The low frequency scale 1 image obtained from the wavelet transformation has some of the texture of the image preserved and some of the edge information (such as the hair). Some edge information is contained in all frequency scales. Box 205 represents the high frequency image scale one after wavelet encoding at the first frequency scale. The high frequency scale 1 image of the first scale will retain only those edges greater than a certain threshold. Thus noise or very soft edges with low modulus values will be eliminated.

The zeroth frequency scale captures the more edges of the image than the other scales because it contains the most frequencies, and any edges will be retained in the encoded data in the first scale if possible. The second frequency scale is a decomposition of the low frequency portion of the first frequency scale resulting in a decreased resolution of the compressed image. Box 207 represents the low frequency scale 2 image after wavelet encoding at the second frequency scale. The low frequency information of scale 1 is transformed using the wavelet function to produce the low and high frequency images in scale two. The texture of the original image 201 is still preserved but not to the extent in the first frequency scale of the original image because decomposed representation of the original image is being transformed. Box 209 represents the high frequency scale 2 image produced after wavelet encoding at the second frequency scale which still retains most but not all of the edge information. The edge information which is retained is not as complete as present in the first frequency scale. The image representation in box 209 does not have the hair or mouth edges although it does show the other edges. The resolution of the edges in the image data of box 209 is less than the image box 205 of the first frequency scale. The third frequency scale is lower in frequency than the second and the resolution of the compressed image will decrease. Wavelet encoding the low frequency scale two image 207 produces low frequency scale three image 211 and high frequency scale three image 213. Box 211 represents the low frequency scale three image after wavelet encoding the image information from low frequency scale two box 207 at the third frequency scale. At the low frequency, the texture of the overall shape is retained but is less than the other two scales. Box 213 represents the high frequency image after wavelet encoding at the third frequency scale. The edge information retained in the coded data is less than the other two scales and only the outline of the face is recorded.

The purpose of the multiple frequency scales is to gain the benefits of compression and edge detection of the wavelet transformation information and further compresses the image using fractal techniques. The frequency scales are used to help satisfy the condition in fractal encoding that each domain block has a similar range block based on the original image. However, by providing the different frequency scales, the blocks can be matched across frequency scales, where a domain block from a higher frequency scale (and thus larger) is matched to a range block of a lower frequency scales. In order to accomplish this, one additional scale must be produced for the highest scale of range blocks used. The domain blocks are always one scale higher than the range blocks in order to increase compression. Thus when the first scale in high frequency scale two box 205 is fractally encoded, the domain blocks must be derived from high frequency scale two box 209 of scale two. Once the average modulus and angles of the range and domain blocks have been calculated and sorted, the difference between the domain and range blocks are determined. If the difference for each domain block with the closest range block is below a predetermined threshold, then the domain and range blocks relative positions will be recorded in a file. Those encoded blocks are shown in box 224 in frequency scale one. The encoded blocks for scale two are shown in box 226. If the difference between the closest range block to a given domain block is greater than the predetermined threshold, that particular domain block must be encoded at a higher scale. The domain blocks which were not recorded to a file are then processed and placed at random location at the next higher scale and a further higher scale is created to become the new domain blocks. Once all the domain blocks have been encoded and the difference value for each domain block is below a threshold, the highest scale containing range blocks, which are on a fixed grid, is itself fractally encoded to preserve texture information and to allow for the image to be reconstructed as explained later. In the example of FIG. 2, low frequency scale two box is fractally encoded to form, encoded box 228. Alternatively, low frequency scale two box could be spatially subsampled to be compressed. The decoding algorithm which is explained in detail later will start with the low frequency image with the lowest resolution (highest scale) of encoded data containing the texture information and add back in the edge information from the fractally encoded high frequency boxes 207 and 205 to ultimately form the original image 201.

Frequency graphs 250 depict one dimensional representations of the frequency components used in each scale of the multiresolution transformation in accordance with this invention. The image is initially transformed into the frequency domain using a basis function (such as a bi-orthogonal spline or a quadratic spline basis) as part of the wavelet transformation technique. The original image is represented spatially as being in the entire frequency range which is represented as running from zero to f, where the frequency range encompasses the entire image. Scale one which is the highest resolution of the wavelet transform divides the frequency scale by a factor of two into a high frequency scale one box 205 and a low frequency scale one box 203 as shown in graph 254. The low frequency range of scale one covers from 0 to f/2. The high frequency range of scale one corresponding to box 205 runs from f/2 to f. Scale two is decreased in resolution by a factor of two from scale one in this example. The low frequency area in graph 254 is now divided in half by the equivalent of low pass and high pass filter as part of the subsequent wavelet transformation to become a new low frequency image 207 and high frequency image 209 for scale two which is shown in graph 256. The low frequency range of scale two corresponds to box 207 and runs from zero to f/4. The high frequency range of scale two corresponding to box 209 covers from f/4 to f/2.

Scale three is then decreased in resolution by a factor of two from scale two in this example. The low frequency area in graph 256 is now divided in half by the equivalent of low and high pass filters to become new low frequency image 211 and high frequency image 213 for scale three shown in representation 258. The low frequency range of scale three corresponding to box 211 runs from zero to f/8. The high frequency range of scale three corresponding to box 213 covers from f/8 to f/4. Scale three would then be decreased in resolution by a factor of two to create a scale four in this example if another scale was required by the encoding technique. If a fourth scale was required, the low frequency component of graph 258 would be divided in half to form a new low and high frequency representation.

The relationship between the frequency scales in group 250 show that it is possible to start with the highest number scale (i.e., lowest resolution) and iteratively reconstruct the high frequency scales until the image is reproduced. Thus when low frequency scale two image 207 is joined with high frequency scale two image 209 of scale two, the low frequency first scale image 203 will be produced. Low frequency image 203 can then be joined with high frequency image 205 of scale one to form the original image. The entire frequency spectrum of the original image can be recreated using this method. This dividing of the frequency ranges allows the technique to store only the data from the low frequency box of the highest scale recorded with range blocks and the high frequency images from each scale. The highest scale used for domain blocks is not needed to be stored because the domain information is stored compressed image file. The remaining low frequency boxes can then be sequentially recreated to generate the original image before encoding.

Arrow 220 shows the relationship between the range blocks in high frequency scale one image 205 to the domain blocks in high frequency first scale 209. The domain blocks for a given frequency scale are mapped to the range blocks of the next lower frequency scale. If there is no match for a given domain block in a particular frequency scale, then the scale will be increased by one and a new matching pair will be sought. Arrow 222 shows the mapping between the range blocks in high frequency scale two image 209 and the range blocks in high frequency scale three image 213. Because the technique had sufficient matches for all the domain blocks in scale three to all the range, blocks in scale two and below, a further scale of range blocks was not required.

Figure 3:
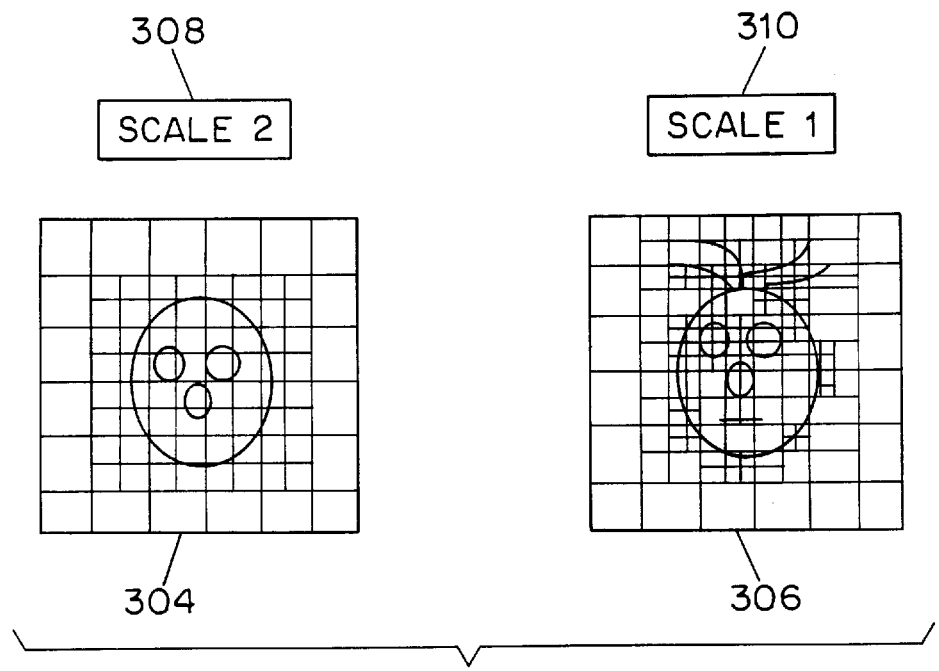
FIG. 3 is a graphical representation of the range blocks shown in FIG. 2.

FIG. 3 shows an example of how the quadtree segmentation in step 105 of FIG. 1 is used across each of scales to subdivide the high frequency images in each scale into range blocks. The quadtree segmentation shows how the range blocks will be allocated based upon the edges of the image provided. A pictorial description is shown in FIG. 3 of the transformed images at each of the frequency scales which contain range blocks. Labels 308 and 310 show the frequency scale numbers. Range blocks 304 corresponds to high frequency box 209 and range blocks 306 correspond to high frequency box 213. Range blocks 304 show the information in the high frequency box of the highest scale (lowest resolution) which contains range blocks. The image information is not as detailed as the lower scale (scale one) because of the multiple low pass filtering performed during wavelet transformation. The image is preferably overlaid with blocks equal in area (although the size of the blocks could vary). Where an edge of the image is present in one of the blocks, that particular block will be present in the other scales of increasing resolution.

Range blocks 306 is shown for scale one and corresponds to box 205 of FIG. 2. The range blocks are to be matched with domain blocks of the next higher scales. The resolution of range blocks is increased by a factor of two in range block 306. This means that overlaid grid will have four times as many range blocks than the higher scale and thus more information will be processed. The increased number of range blocks for the same image allows additional edges and features to be stored and represented than were found in the third scale range blocks 302. In particular, the eyes and nose of the face of the original image are now represented by the range blocks 304 of scale two.

Figure 4:
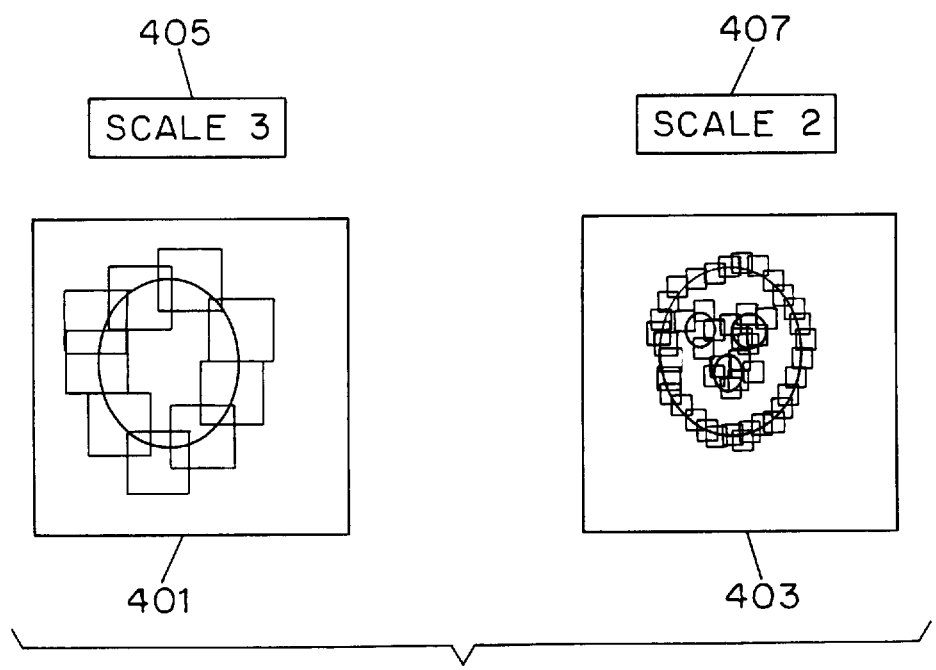
FIG. 4 is a graphical representation of the domain blocks shown in FIG. 2.

FIG. 4 shows graphical representations of the domain blocks which have the high frequency images divided into a set of all possible domain blocks that occur at modulus edges. The image is referred to as a modulus image because only the blocks with edge information above a certain threshold are represented after wavelet transform. If a block does not contain an edge because too little information is present, it will be ignored. A threshold level of the amount of image information is established to ignore domain blocks with a small amount of edge information or noise. The threshold level can be set at such a level which will increase the efficiency of the encoding technique while being balanced against the loss of edge and texture information from removing too many blocks. Labels 405 and 407 show the frequency scale numbers. Domain blocks 401 show a representation of only the domain blocks which contain edge information from the scale three wavelet transformation. All the remaining domain blocks have been ignored. Domain blocks 403 shows a representation of only domain blocks which contain edge information from the scale two wavelet transformation. There is no scale one domain blocks because the domain blocks are always compared with the range blocks form one scale below. Thus there would be no range block of scale zero for a scale one domain block.

Each individual range block of range blocks 302, 304 and 306 and individual domain block of domain blocks 401 and 403 are then pre-classified by the average modulus and average gradient angle of the image information contained in each block. The equations for generating the classifications are detailed in the explanation of FIG. 1. Labels 515, 517 and 519 show the frequency scale numbers. Labels 521, 523 and 525 identify the block type or representation type. The average modulus value and average angle values for each domain and range block will then be sorted and stored in a compressed file.

Figure 5:
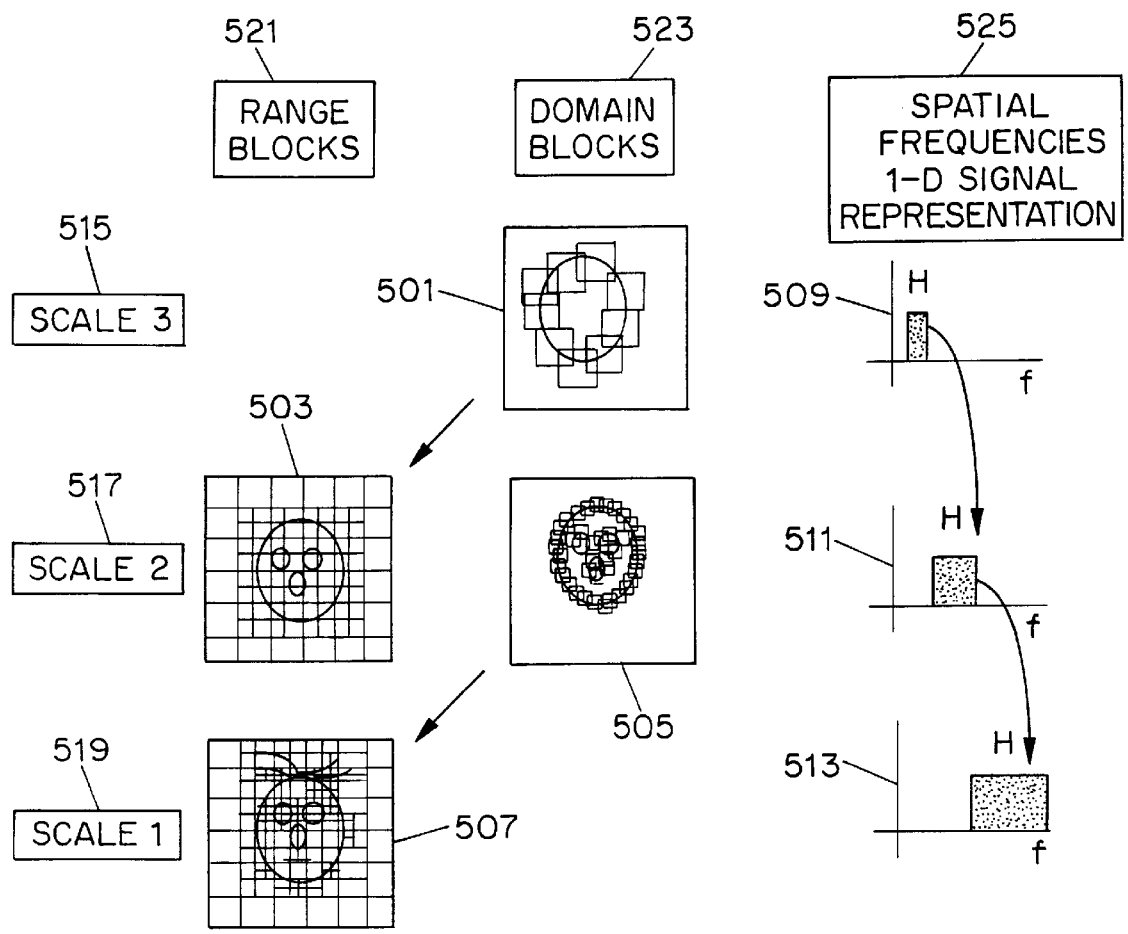
FIG. 5 is a graphical representation of the matching step of FIG. 1 applied to the example in FIG. 2.

FIG. 5 shows a graphic representation of matching the domain blocks from FIG. 4 to the range blocks of FIGS. 3 in accordance with the steps of FIG. 1. Domain blocks 501 of scale three is matched to the smaller range blocks of the next lowest scale, in this case scale two. Domain blocks 505 of scale two is matched to the smaller range blocks 507 of scale one. The conventional way of matching a domain block to a range block is by comparing every domain block to a corresponding range block by least means square differencing, which is computationally intensive. However, in accordance with present invention, the average modulus and angle values of the image information in each range and domain blocks are stored and sorted in tables. The tables are then compared to see if there are matching range blocks to each domain blocks based on the average modulus and angle values. Once sorted, the entire list of range blocks does not need to be checked for each domain blocks, but only the pre-classified blocks with close to the same normalized average modulus and angle values. Thus a domain block with an low average modulus and angle will be checked against range blocks with low average modulus and angles. If the difference in values between the a particular domain block and the corresponding range blocks is greater than a certain threshold value, then there is not a sufficient match between the blocks for the given frequency scales and another frequency scale must be generated to further sub- divide the image and check for mistakes. Generating three frequency scales is a typical example of the required scales for encoding an image of picture quality.

There are a number of steps which can be performed to allow faster matching of domain blocks to range blocks. First, the number of domain blocks could be increased by decreasing the size of the domain blocks. The domain blocks could be rotated or otherwise transformed to provide additionally matching options. Moreover, the matching of domain to range blocks could be expanded to scales which are not sequentially related. For example, a range block is scale one could be matched to a domain block is scale three. These methods will increase the efficiency of the encoding process.

Figure 6:
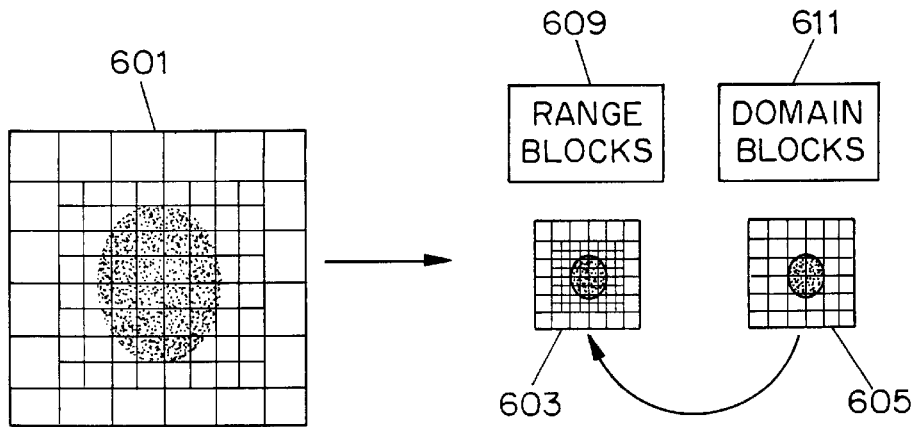
FIG. 6 is a graphical representation of the spatial decimation of the low frequency image of scale 2 associated with the example of FIG. 2.

FIG. 6 is a graphical representation of fractally encoding the low frequency representation at the highest scale with range blocks of the original image. In this example, the highest scale which contains range blocks is scale two and the low frequency image containing the image information is shown low frequency scale two image 601 (corresponding to box 207 of FIG. 2). Labels 609 and 611 show the types of blocks used for spatial decimation. The domain blocks 605 of the low frequency image 601 are then matched to range blocks 603 of the same image and are encoded using conventional fractal techniques. The mapping of the range blocks and the domain blocks which represent the low frequency image of the second scale are stored in the compression file. Alternatively, spatial subsampling can be used to encode the low frequency image.

Figure 7:
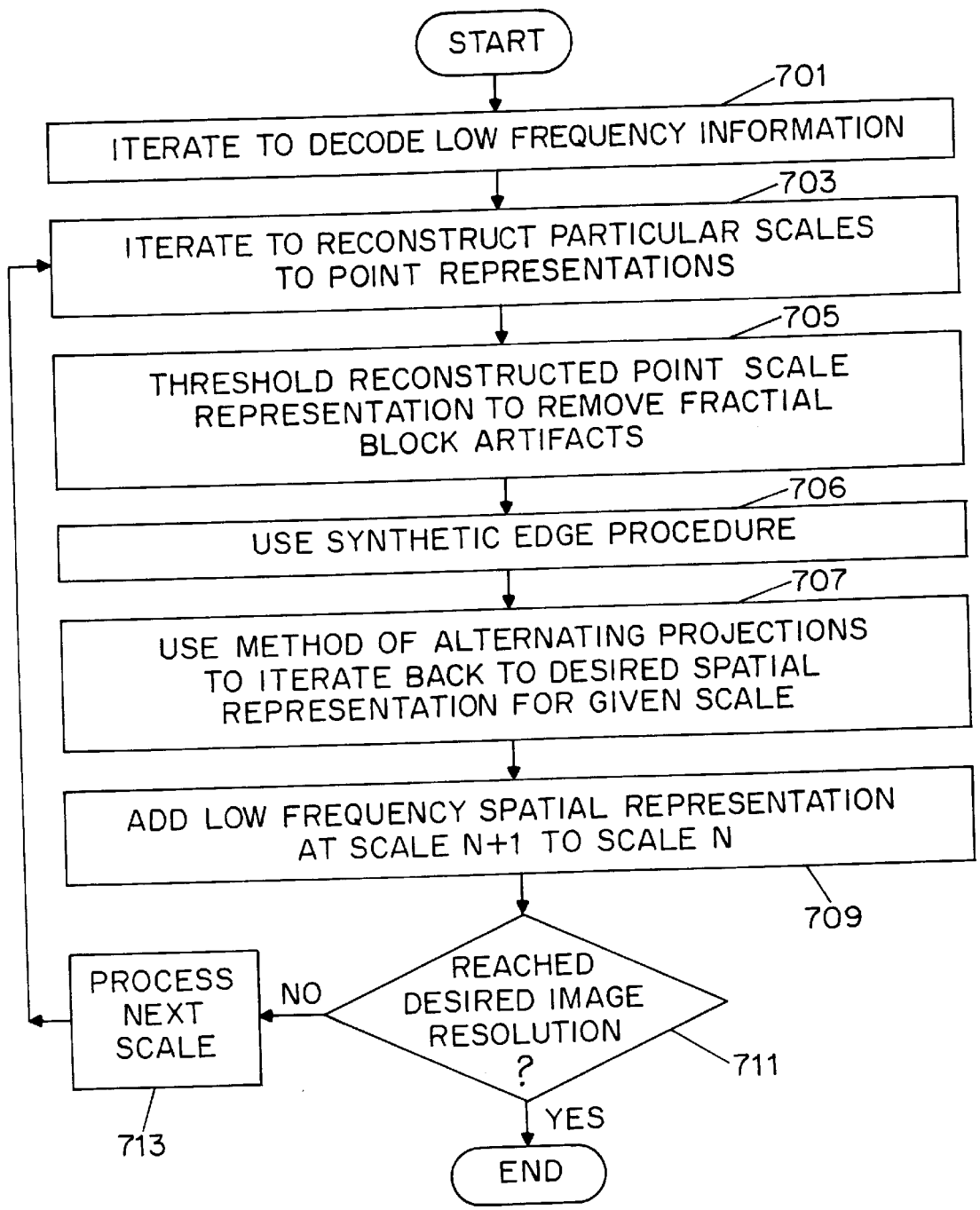
FIG. 7 is a flow chart of the steps for decoding compressed image information in accordance with the invention.

FIG. 7 shows a flow chart of the steps involved with the image decoding portion of the technique in accordance with the invention. The decoding process transfers the data representing the compressed image so that the coded and compressed information will be reconstructed to be a very close approximation to the original image. The more iterations of the decoding steps performed for some portions of the decoding technique described below, the closer the reconstructed image will be to the original image. The following technique of FIG. 7 is for performing image decoding of a compressed image which has been encoded with the technique described in FIG. 1. An example of the decoding technique applied to a particular encoded image will be shown in FIG. 8.

Step 701 iterates using conventional fractal techniques to decode the fractally encoded low frequency information which was stored in the encoded files containing the matching domain and range block locations for that particular image. The result will be the low frequency image in the highest scale which contains range blocks used for the original encoding. The low frequency texture information of the original image will be reproduced for that particular scale.

Step 703 iterates to fractally reconstruct a particular point representation of the high frequency information for that highest scale to a point representations. In the example of the fractally encoded image 226 shown in FIG. 2, the image will be reconstructed using conventional fractal techniques. The ultimate number of iterations required to perform the original image depends on the desired accuracy of point reconstruction. A typical example is three iterations of the conventional fractal technique. The iterations are performed on the stored high frequency representation to reproduce the edge information for the high frequency portion.

Step 705 then processes the point scale representations of the high frequency image of each scale to remove blocky artifacts created by the fractal decoding by thresholding. If the average modulus value of an image in a block is below a predefined threshold, it will not become part of the image. This allows the advantages of wavelet transformations of edge detection to be combined with the fractal compression advantages.

Step 707 uses a method of alternating projections to iterate back to a desired spatial representation for a given scale by combining the low frequency and high frequency image for the scale. The data is recursively sent through an inverse filter to transform the wavelet encoded data for the low and high frequency information to the next lower scale. This process takes the information from the lower resolution scale (higher scale number) and creates an image whose frequency representation is in the next lower scale which has greater edge information and a higher resolution. The number or iterations for reconstruction of each scale is variable and depends on the required accuracy of the reproduced image. A typical number of iterations is three. This approach yields a 25 dB power signal to noise ratio at a 35 to 1 compression ratio. For a 30 dB power signal to noise ratio at a 35 to 1 compression ratio, the synthetic edge is used between Steps 708 and 709.

Step 709 then adds the low frequency representation to the fractally decoded high frequency representation, both of which have been transformed through a inverse scale filter to form images at the lower scale. The addition of the low frequency image to the high frequency image gives the reproduced image both texture and defined edges at the next lower scale.

Step 711 checks if the decoded image is at the desired level of image resolution at the frequency current scale. This can be predefined by the program or can be assessed in real time as the image is being decoded. If the image is at an acceptable resolution, the decoding technique is done. For example, an operator may simply want to determine if an object appears in a normally blank image field. The operator would need a high resolution image for his/her purposes. If the reconstructed image is not at an acceptable image, then the technique continues with step 713.

Step 713 begins the process of decoding at the next lowest scale. The result of the addition of the high and low parts of a particular scale now become the low frequency representation of the next lowest scale. The stored high frequency representation for the next scale level will now be used to iteratively reconstruct the information at that scale level. With the new low frequency and high frequency information defined, the technique continues with step 703. If there are no more lower scales to process, the image will be fully decoded.

Figure 7A:
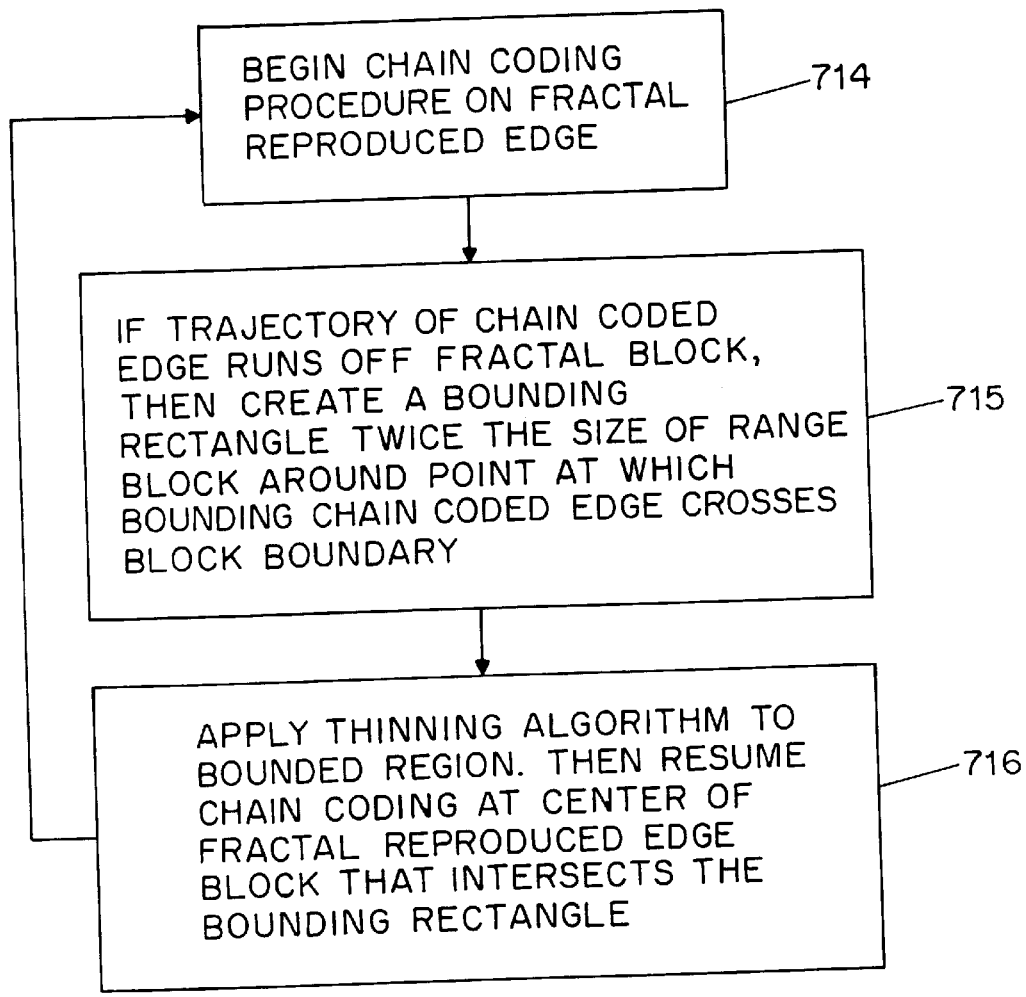
FIG. 7A is a flow chart of the steps of an exemplary synthetic edge procedure.
Figures 7B, 7C:
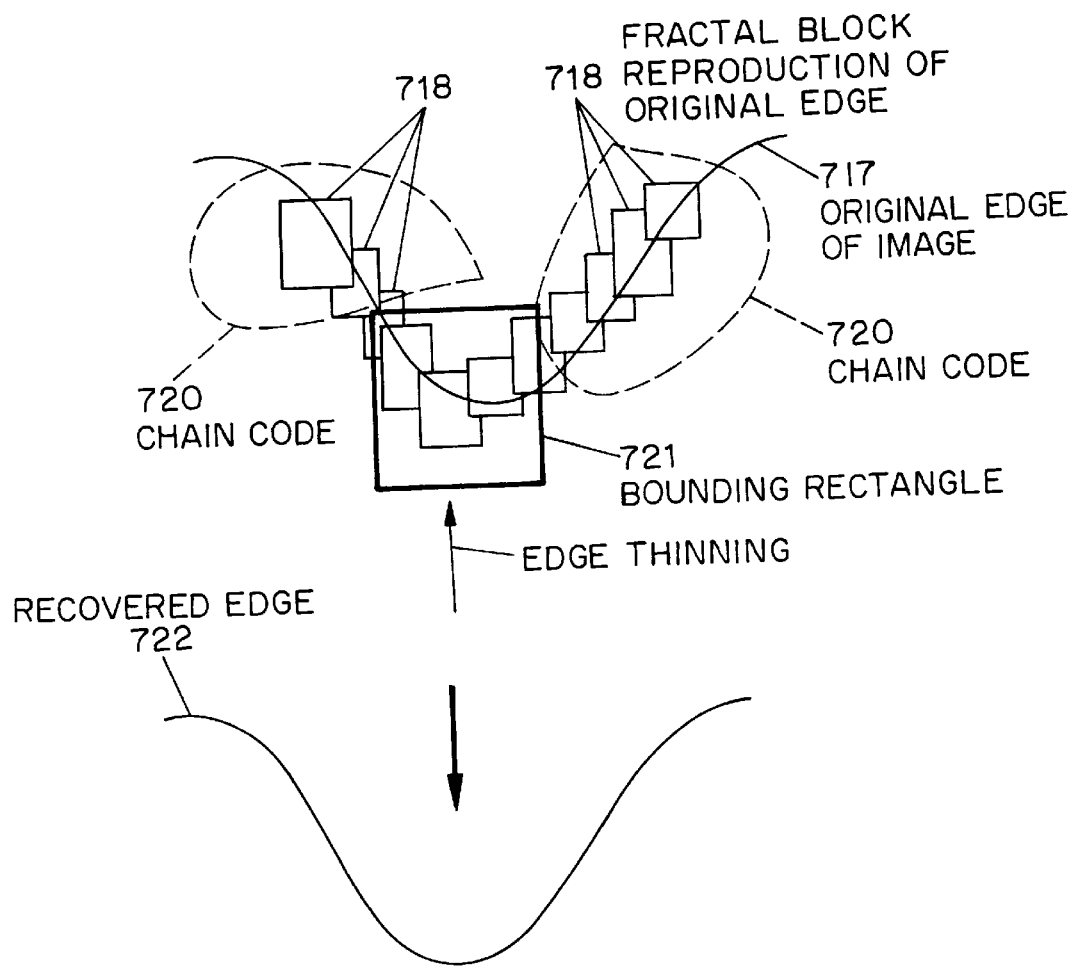
FIG. 7B is a depiction of an exemplary application of the synthetic edge procedure.
FIG. 7C is a diagram representing a block of nine pixels, $P_1, P_2, P_3 \ldots P_9$.
Figure 8:
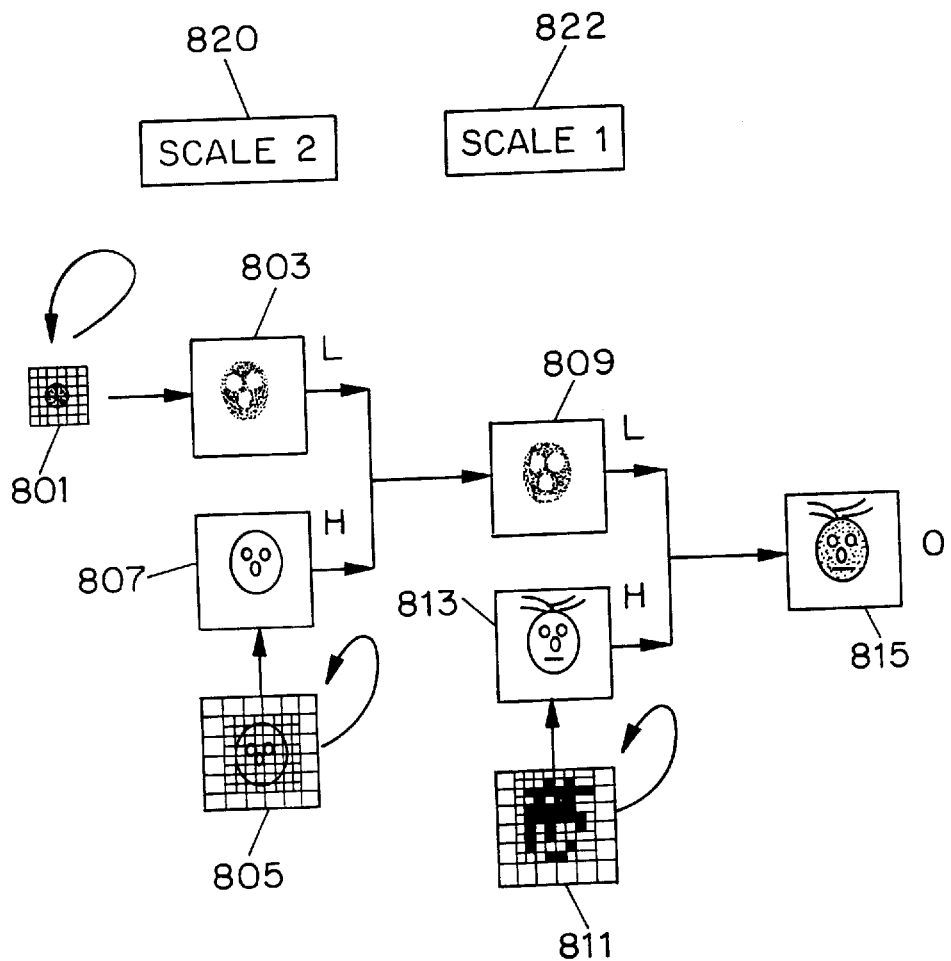
FIG. 8 is a graphical representation of the decoding process of FIG. 7 applied to the encoded image of FIG. 2.
Figure 8:
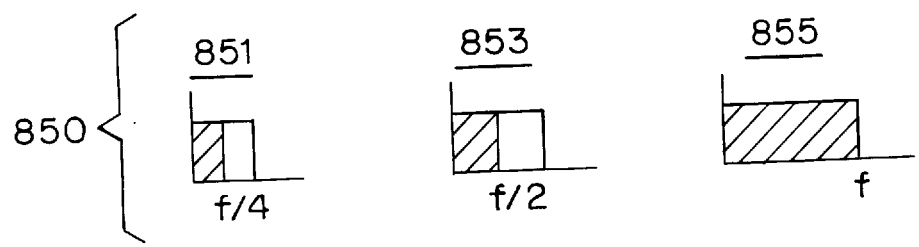

FIG. 8 shows a graphical representation of the decoding process for an image described in FIG. 7. Labels 820 and 822 show the frequency scale number. The encoded data 801 for the low frequency image information of the highest scale with range blocks which was stored previously is reconstructed by iteration using conventional fractal technique to reconstruct the point images. Synthetic edge is applied after fractal reconstruction at each scale. The number of iterations used depends upon the desired closeness to the original image. Each iteration places the shrunken domain blocks into the range block positions to form a new image. The initial image can be random because after a certain number of iterations, any starting image will be transformed to the original image using the mapping of the blocks. After a certain number of iterations using the domain-range block mappings, the original image will reappear. When the low frequency information is decoded, low frequency box 803 of scale two is created. This transformation step corresponds to step 701 of FIG. 7. Next the high frequency encoded information 805 for scale two is decoded using conventional fractal techniques of self iterations. The result is high frequency scale two image 807. This step corresponds to step 703 in FIG. 7. Step 705 of FIG. 7 of applying a threshold is then performed on the decoded images stored in box 803 and 805 to remove any blocky artifacts. Further removal of any blocking artifacts may be accomplished by using the synthetic edge procedure of Step 706. A flow chart showing further details of Step 706 is shown in FIG. 7A, and a depiction of an exemplary application of the synthetic edge procedure is shown in FIG. 7B.. The purpose of the synthetic edge is to reproduce the original edge, which is essentially 1 pixel wide, from the fractal block edge, which can be up to the width of the fractal range blocks. Ideally, the perfect fractal reconstruction of the reblocked edge should be 1 pixel wide. Using the synthetic edge procedure example illustrated in FIGS. 7A and 7B, chain coding 718 (step 714 in FIG. 7A and 720 in FIG. 7B) is first performed on the fractal reproduced edge 718. If the trajectory of the chain coded edge runs off the next fractal coded block in the chain, a bounding rectangle 721 of twice the range block size is created around the point at which the bounding chain coded block ran over the block boundary (step 15 in FIG. 7A). An edge thinning algorithm is then applied to the bounding rectangle 721, and thereafter the chain coding is resumed at the center of the fractal coded edge block that intersects the bounding rectangle (step 716 in FIG. 7A).

With respect to the edge thinning algorithm, reference is made to FIG. 7C which shows a block of 9 pixels, including a central pixel, $P_1$, and 8 surrounding pixels, $P_2$, $P_3$, $P_4$, $P_5$, $P_6$, $P_7$, $P_8$, and $P_9$. If $ZO(P_1)$ is the number of zero to non-zero transitions in the ordered set $P_2$, $P_3$, $P_4 \ldots P_9$, $P_2$ and $NZ(P_1)$ is the number of non-zero neighbors of $P_1$, then $P_1$ is deleted if the following conditions are met:

$$2 \leq NZ(P_1) \leq 6$$

and $ZO(P_1)=1$ and $P_2 \cdot P_4 \cdot P_8 = 0$ or $ZO(P_2) \neq 1$ and $P_2 \cdot P_4 \cdot P_6 = 0$ or $ZO(P_4) \neq 1$.

The foregoing edge thinning algorithm may be used to significantly increase power signal to noise ratios. Those skilled in the art will recognize that this algorithm may be fine tuned to obtain even higher power signal to noise ratios. Ordinarily, the closer the edge is to the original wavelet filtered edge, the better will be the results obtained.

In step 707, the two images in boxes 803 and 805 are separately applied to an inverse filter which changes the frequency scale of each image to the next lowest scale. The method of alternating projections (which is known in the art) is performed iteratively on the two images to produce a images in the next lowest frequency scale. Each image in the low frequency and high frequency images is then added together to form the next low frequency box 809 of scale one, the next lowest scale. This step corresponds to step 709 of FIG. 7. The image stored in box 809 now contains the edge information of decoded high frequency step two image 807 and the texture information of low frequency step two image 803. If the image has sufficiently been reproduced after the first frequency scale has been processed, the technique is done as indicated in step 711 of FIG. 7. If the image needs further refinement, scale one will be processed in the same manner as scale two.

In the example shown in FIG. 8, the image is reconstructed after scale one and its encoded high frequency scale box scale and image 841 are processed. Box 813 is the decoded image of the high frequency portions of the first scale and is added to low frequency box 809 to form box 815 which is a reproduction of the original image.

Group 855 shows in a one dimensional manner how the frequency scales are reproduced. The image was originally shown across a full frequency scale from 0 to f for the original image when f is the full frequency representation of the image. Graph 851 shows the low frequency data corresponding to image 803 running from zero to f/8 and the high frequency data corresponding to image 807 running from f/8 to f/4. When these frequency components are added together in step 709 at FIG. 7 they form the new low frequency component of the next scale shown in graph 853 (running from zero to f/4) and corresponding to image 809. The high frequency component runs from f/2 to f and corresponds to image 813. When the frequency components of scale two are added together they form reproduced image 815. The reproduction image 815 of the original image is shown in graph 855 and runs from zero to f which contains the entire frequency range of the original image (see graph 252 of FIG. 2).

Figure 9:
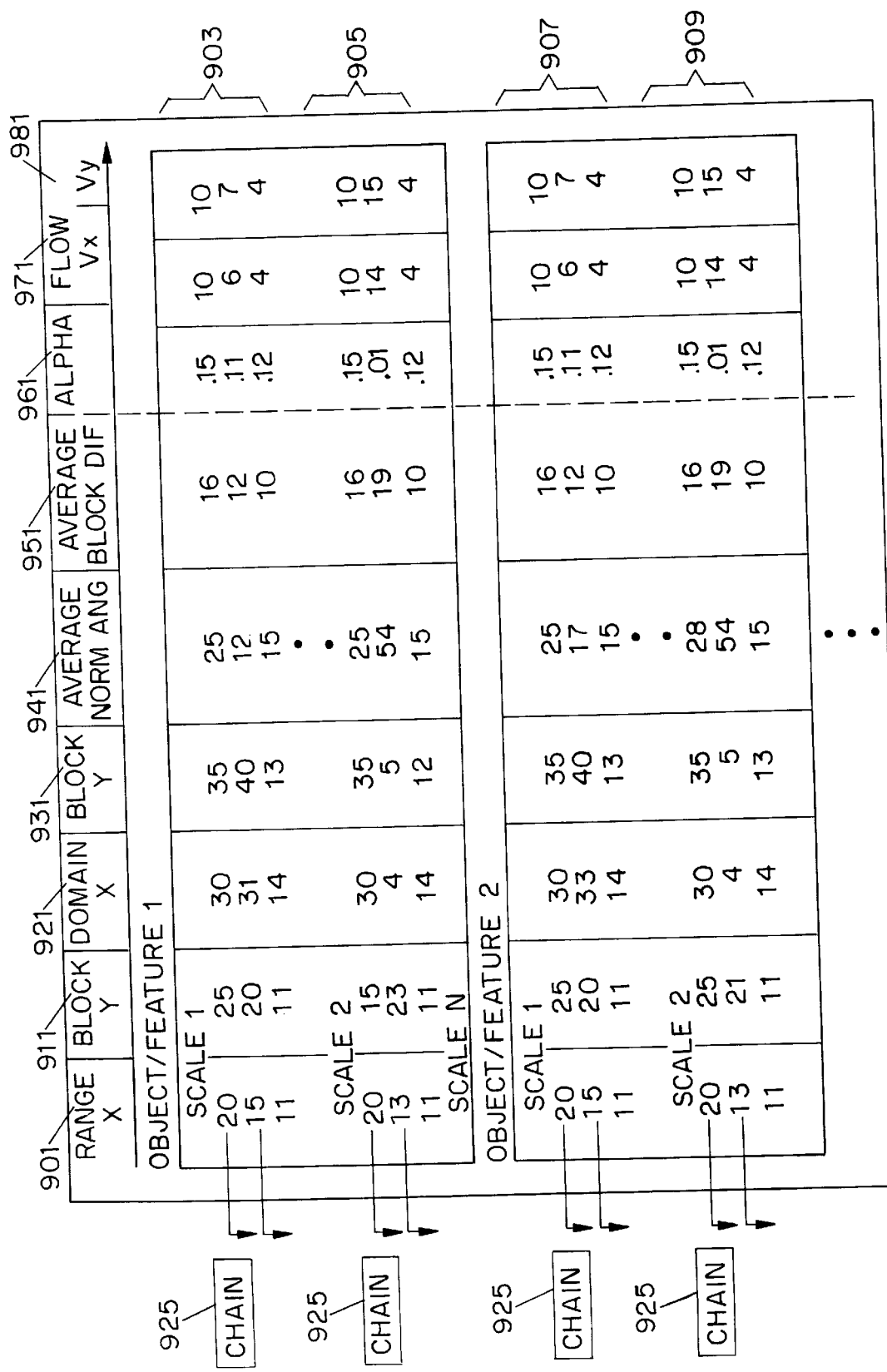
FIG. 9 is an example of a file of compressed image data generated in accordance with the invention.

FIG. 9 shows a file organized in a preferred format for image data which was compressed and encoded using the technique described in FIG. 1. The object oriented storing format shown is useful is pattern recognition and video encoding. However, the file can be organized irrespective of objects if the application does not require object identification. Object oriented aspects of the invention will be described in subsequent sections. The data file 900 shown in FIG. 9 is organized into a number of columns. Column 901 in entitled "Range Block X" and contains the location of a particular range block relative to the X direction of a two dimension grid (X,Y). Column 903 in entitled "Range Block Y" and contains the location of a particular range block relative to the Y direction of a two dimensional grid. For example, if a grid has 100 points in a ten by ten array, the first block in the lower left hand corner would have coordinates (0,0), i.e., x=0 and y=0.

The range blocks shown in file 900 are chain coded such that the edges of a particular object are stored sequentially and if plotted would form the object. Label 925 indicates a chain coded edge. For each object identified in the image, the range and domain block information of each scale which is used to encode the object is stored separately. In this example, range block and other information is shown grouped for the identified first object in the first scale in data 903; the information is grouped for the first object in the second scale with data 905; the information is grouped for the second object in the first scale with data 907; and the information is grouped for the second object in the second scale with data 909. Note that the data shown for each object would in actual use have many more entries. The number of scales stored depends upon the number of scales used in the encoding scheme.

Also stored in file 900 is the relative locations of the domain blocks for each object in column 921 entitled "Domain Block X" and column 931 entitled "Domain Block Y". Column 921 contains data of the domain blocks in the X direction of an (X,Y) two dimensional grid. Column 931 contains data of the domain blocks in the Y direction of an (X,Y) two dimensional grid. The identified domain blocks correspond to the range blocks identified on the same line of the file in columns 901 and 911. Column 941 is entitled "Average Norm Angle" and is the average normalized modulus angle calculated for the particular domain block. A domain block is made up of a multitude of pixels (Example could be 2, 8, 64, 526, etc.) and the average angle is calculated by the equations shown with respect to FIG. 1. The average block difference which is indicative of the average relative intensity of the pixels in the particular domain block is stored in column 951 entitled "Average Block Difference". The three columns on the right of file 900 are used for video encoding and pattern recognition. These three columns will be explained in detail in when the pattern recognition and video encoding technique is described. Column 961 is entitled "Alpha"; column 971 is entitled "Flow $V_x$"; and column 981 is entitled "Flow $V_y$". File 900 can also contain a header which includes information such as the highest scale factor of the compression (two in the examples of FIGS. 2–6), the number of objects in the image and the number of iterations use to encode each individual image.

Figure 10:
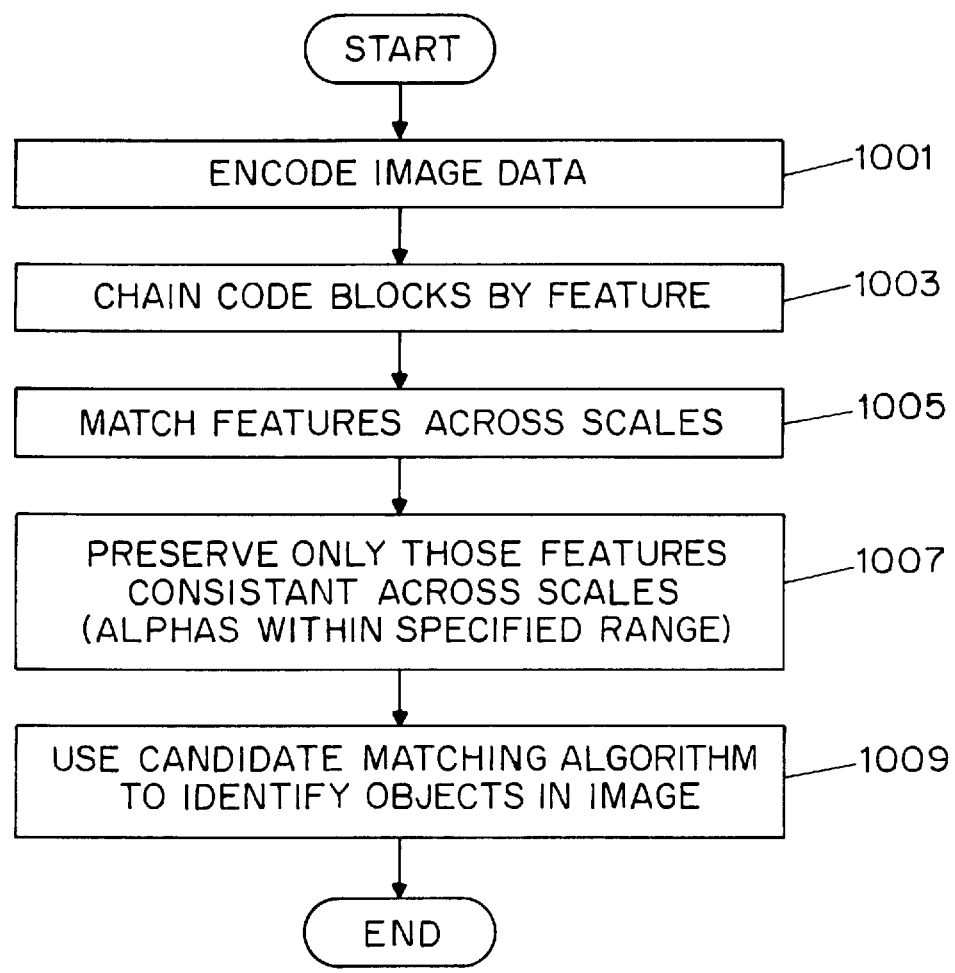
FIG. 10 is a flow chart of the steps for performing pattern recognition using image data encoded in accordance with the invention.

FIG. 10 shows a flow chart of the steps involved with the pattern recognition portion of the technique. The encoded and compressed data could be used only to transmit or store data for later recreation of the image, although the present encoding technique provides a powerful tool for pattern recognition. The range blocks are chain coded for pattern recognition which will identify the outside edges of separate objects. Thus if a bowl of fruit is the image to be analyzed, stored encoded images of a banana or other desired fruit can be compared to the images identified by chain coding the objects in the bowl of fruit. The pattern matching technique can be extended to identify any object of which an encoded pattern is already stored. Because the objects are encoded and compressed, the pattern recognition routines will be much quicker than if a conventional bit by bit match was attempted. Moreover, the edge information of the images to be identified is stored in accordance with the invention with better compression and easier matching capabilities.

Step 1001 of the pattern recognition technique encodes the image to be matched with the encoding technique described in FIG. 1. The result is a file listing of the relative locations of the identified domain and range blocks for each scale for an object as shown in FIG. 9. Step 1003 then chain codes the blocks by feature if not already done in the encoding steps. Chain coding is not required for simple storage or transmission so it would not be performed in the encoding steps unless pattern recognition or video encoding was desired. Chain coding itself in well known in the art and stores the relationship of the edges of an object which helps identify the object. For each range block along an edge, both the relative position within the image and average angle and modulus are stored. The average angle represents the average gradient of the edges in the block, and the modulus shows the intensity of the image at that point. The chain coding continues until a complete image created from the edges is formed or the line of edges simply stops. If in a range block which should predictively contain edge information due to the modulus and angle values surrounding it but does not, that block can be corrected and replaced with the expected information. This may be determined by "neutral network" or other decision making techniques known in the art. However, the end of an edge may signal the end of an object or a another object covering the first.

In order to determine if an object is "blocking" or overlapping another object in the image field, the Lipschitz equation, which is well known in the art, is used. The Lipschitz equation is the following:

$$M_{2^j}f(x,y) \leq k(2^j)^\alpha \qquad (12)$$

Essentially the $\alpha$ criteria measures the intensity of the wavelet modulus as the image function progresses to successively higher scales (lower frequencies). If an object has a small α exponent, the intensity of the wavelet modulus maxima (points of the image which exceed the threshold) stays relatively constant over a number of scales and there is essentially a "hard edge" which stays the same from scale to scale whereas higher α indicate softer edges. Thus, edges with a calculated α can be used to characterize edges in objects in images which is an extremely useful property in removing noise from objects and for identification purposes. A low α indicates occlusions where there are multiple overlapping objects in the image by showing a drastic change in the image edge rather than a softer edge such as a transition from an object to a background.

Figure 11:
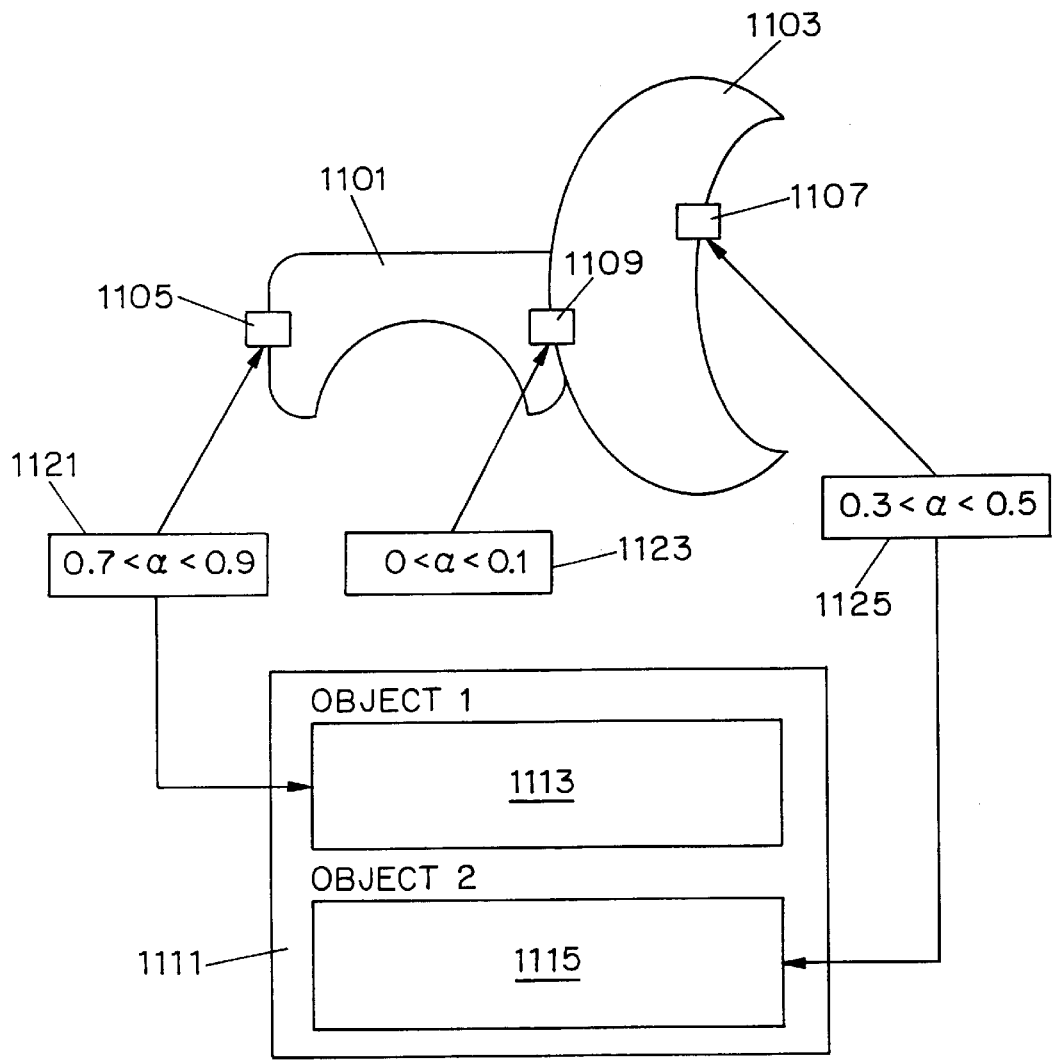
FIG. 11 is a graphical representation of multiple objects which are processed with the pattern matching technique of FIG. 10.

FIG. 11 depicts two objects in an image field which are to be matched to a stored image in the pattern recognition embodiment. The image data for each object will be stored and encoded by the multiresolution transform as described in FIG. 1. The first image 1101 is shown as being partially obscured by the second image 1103. Using the Lipschitz equation to compute the α value for a given block along the edges of each image, the type of edge can be determined for each point in each object. The α value is based on how quickly the edge spreads out over the given scales, or on how consistent the modulus maxima value is for a given block as one increases in wavelet scale. If the edge does not spread out, it is a "hard edge" and α is close to zero. This would indicate an edge created by occlusions because of the drastic sharp change in modulus value. If the edges do spread out over the given scales, then the edge is "soft" and α will be larger and closest to a value of one. A soft edge indicates that there is not an occlusion and the surrounding portions will not be obscured by another object. If the edge is extremely soft (α almost equal to one), then the image information will most likely be noise and can be removed.

Labels 1121, 1123 and 1125 indicate the alpha values for an edge block of an object. In the example, block 1105 indicated has a relatively large α (close to a value of 0.9) for the point so it has a soft edge. Therefore, the stored edge should not be due to another object blocking the one shown. Block 1107 has an α between 0.3 and 0.5 at the indicated point. Therefore, the edge is not as "soft" as block 1105, but is still high enough to be considered the edge of the object and not a blocking object. Block 1109 has an α value between zero and 0.1 and is therefore identified as a "hard edge". The edge is identified as an overlapping edge. An analysis of the modulus and angle values for the surrounding stored blocks in an object will identify which of the objects contain the edge in question without occlusion to complete the object. The remaining object which was partially obscured can then be matched for only that portion which is unobscured. File 1111 will contain the data for the objects chain coded and stored consistent with the file described in FIG. 9. File portion 1113 will contain the data for the first object and file portion 1115 will contain the data for the second object.

Step 1005 of FIG. 10 matches the features across the scales using the Lipschitz's α from equation 12 described above in order to eliminate any noise for the object. Noise might consist of blurred edges or pieces of objects which should not be part of the image field. The calculated Lipschitz α values are used to distinguish noise from the actual object information. If the α values are close to one (or a predetermined threshold), the edges will be very soft and the information will not indicate an edge of an object. Those blocks with the high Lipschitz α values can be discarded as noise to create an image with higher resolution. Steps 1005 and 1003 can be performed at the same time after one α value is calculated for each block containing information.

Step 1007 preserves only those features which are consistent across the scales. This can be done by taking only those Lipschitz α values which have low values or are within a specified range. The range may by from 0 to 0.5. This will preserve only the clearly defined edges to be compared against stored images which are used to identify the objects in an image. The texture portion of the image is not as important in pattern recognition as the distinct edges in the image. This step may be performed simultaneously with step 105 where noise is eliminated.

Figure 12:
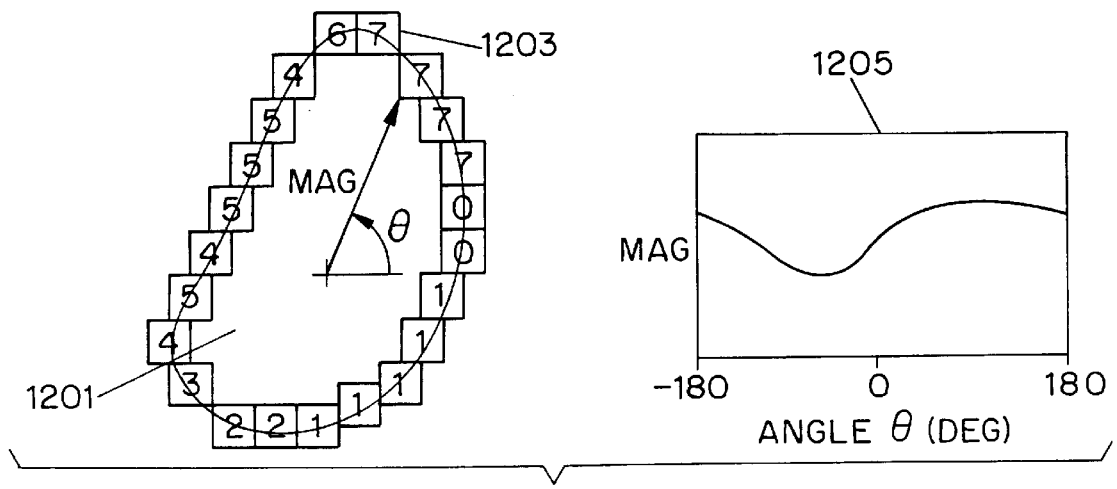
FIG. 12 is a graphical example of range block centroid matching used in the pattern matching technique of FIG. 10.

Step 1009 then used a conventional candidate matching algorithm to identify objects in the image field when compared to stored objects. The candidate matching technique for matching objects calculates the centroid (center of mass) of the overall object and calculates the angle and magnitude from the centroid to each block containing edge information for object. FIG. 12 shows the edge blocks of an image to be identified. Edge block 1203 is one of many blocks which contains edge information. The distance and angle between the centroid and each edge block is recorded in signature graph 1205. The signature graph will be the same for the object 1201 no matter how it is rotated or turned except for a phase shift in the calculation of the angle which can be adjusted for. The signature graphs of the image to be identified can be compared to signature graphs of stored objects to efficiently determine if a match is present. Alternative known matching techniques which can be used are neural network, eigenvalue or correlation matching.

Using the inventive encoding techniques, the objects have been encoded, compressed and transformed to the wavelet domain to preserve edge information using the lowest possible amount of data for storage. The compression feature allows many objects to be stored in a database archive which can be matched against to identify objects in a new image. Thus if the encoded compressed images of every car model sold in the world over the last twenty five years was stored in a database, a system including a camera device to scan and store the image of cars could identify any vehicle which was scanned by the camera. Information of types of cars based on sticker prices, types of drivers and other information could be stored and processed with the images. Similar applications could include a database of stored images of people who work at a manufacturing plant which requires high security measures. People whose facial images were not in the database could be quickly identified as an outsider which would alert company security.

After an image of an object has been matched to one in a database, descriptive information stored which is correlated to the matched stored image could be displayed to help identify the object in the image field. A written description could be produced independently or as a text overlay on the image itself. If an object to be identified had been partially obscured, the matching technique would only be applied to the edge information associated with a portion of the particular objects stored in a database which correspond to the unobscured portion of the image to be matched.

Figure 13:
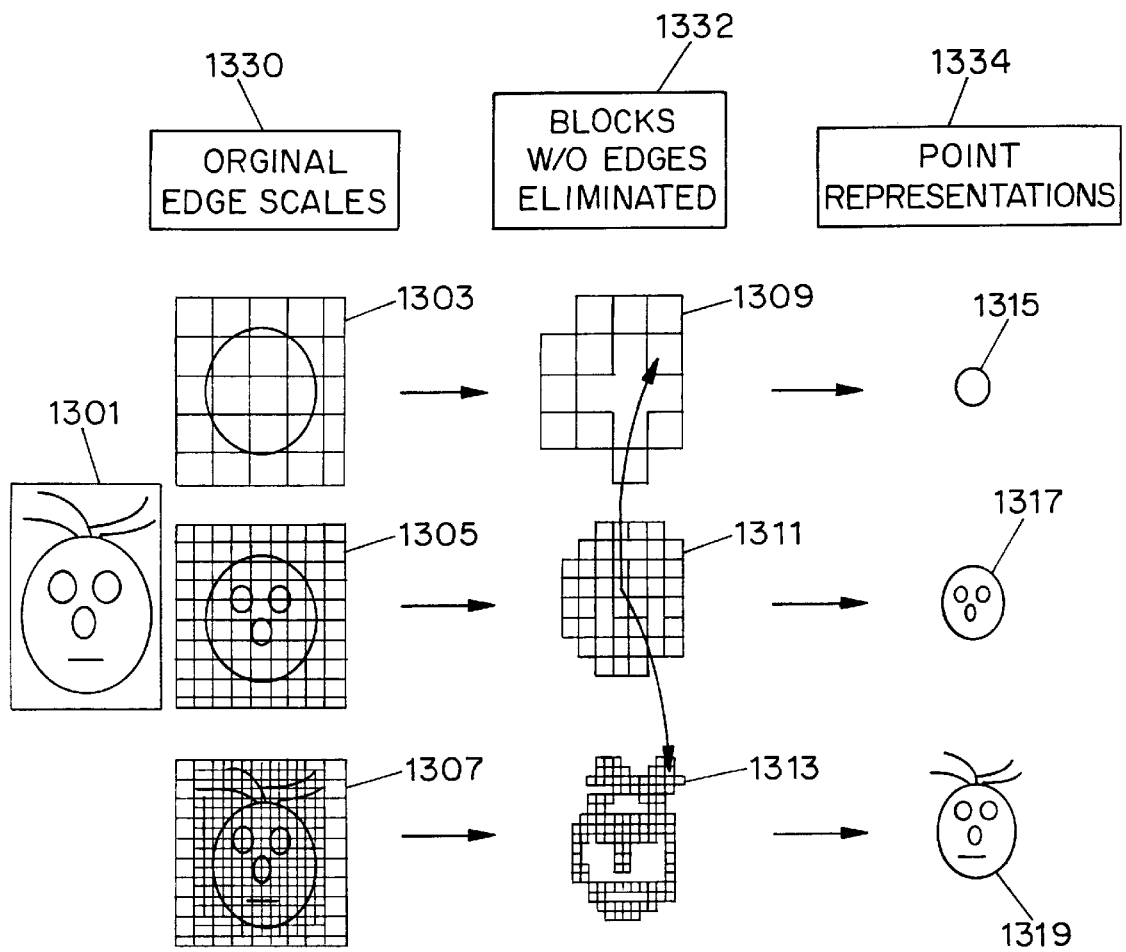
FIG. 13 is a graphical representation of performing the pattern matching technique of FIG. 10 to an unencoded image.
Figure 13:
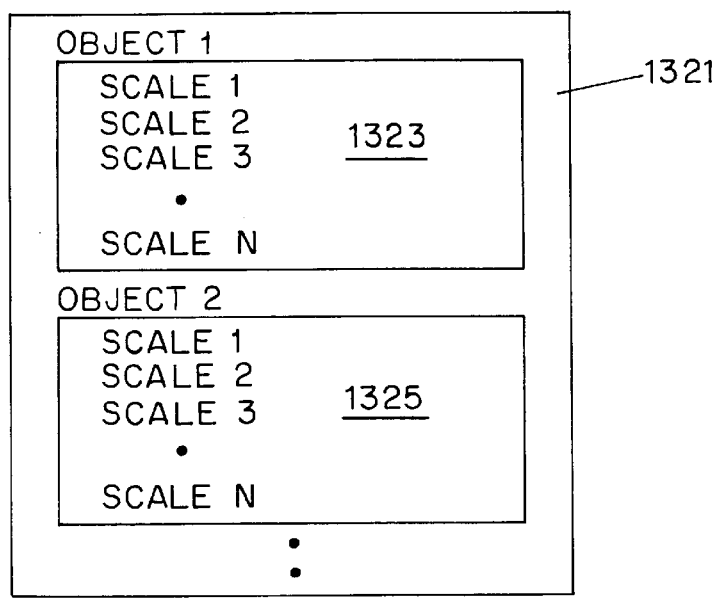

FIG. 13 is an example of applying the shape recognition technique described in FIG. 10 to an image 1301. The image is subdivided into a number of frequency scales through the process of encoding the image in accordance with technique of FIG. 1. There are three scales in this example. Labels 1330, 1332 and 1334 help identify the columns in the figure. Scale one corresponds to box 1307 which has the highest resolution. Scale two corresponds to image 1305 which is lower than the resolution of box 1307. Scale three has the lowest resolution and is shown in box 1303. When the edges are chain coded, the blocks which do not contain edges or have a small modulus value are eliminated because only edges over a specified threshold are chain coded as previously described. Thus image 1303 will be transformed into object 1309, image 1305 will be transformed into object 1311, and image 1307 is transformed into object 1313. The Lipschitz exponent α can be used to further define the edges of any objects and eliminate any noise. The resulting edges which have the α value within the desired range will be recorded in a compressed data file 1321. The compressed data file will have the same format as the file described in FIG. 9. For each block in a chain, the (X,Y) coordinate block position will be stored for the range and corresponding domain block. The average modulus difference between the blocks and the average gradient angle in the blocks will also be stored. Each object will have its own chain coded blocks as shown in object one portion 1323 of file 1321 and of object two portion 1325 of file 1321. The compressed data files for each object can be checked against a database containing the chain coded data for objects to be matched against. Both images will remain in their compressed form for the comparison. The pattern matching technique of centroid matching described with FIG. 12 can be used.

The encoding and pattern matching techniques can also be extended to video compression and video pattern detection. The motion of objects in a video stream can be modeled based on the optical flow of the edges in the detected imagery. The optical flow of an image function is defined by an intensity function represented by I(x,y,t) has two components which are defined by the following equation:

$$\frac{\partial I}{\partial x} V_x + \frac{\partial I}{\partial y} V_y = \frac{\partial}{\partial t} I \quad (13)$$

At a fixed time t, instead of solving the motion constraint in equation (13) for the image I(x,y,t), the image can be smoothed with the smoothing function θ(x,y) dilated by a factor of 2j. The smoothed image reduces the computational noise when estimating partial derivatives of finite differences and yields the following equation:

$$\frac{\partial I}{\partial x} (I_t \otimes \theta_j) V_x + \frac{\partial I}{\partial y} (I_t \otimes \theta_j) V_y = \frac{\partial I}{\partial t} (I_t \otimes \theta_j) \quad (14)$$

Equation (14) allows the technique to recover the normal component of the flow from the wavelet transform at the scale 2j. Instead of computing this normal component at all points (x,y) of a video image, the normal component is computed at only the locations were the wavelet modulus is locally maximum (exceeding a threshold). This technique saves significantly in computational complexity over traditional optical flow computation techniques.

Equation (14) is used in the present invention to perform video compression and detection by computing the average optical flow with each block which contains edge information exceeding a threshold. Using a block based technique in video compression yields two advantages. First, we can detect flow changes within blocks and predictively estimate the positions of both range and domain blocks. Using this technique to update video, only blocks where significant changes occur require updating which allows drastically reduced required bandwidth needed to transmit the video images. Secondly, localized wavelet transformations can be performed within a block and thus localized flow for updating an image can be accomplished by only changing the data content of some blocks for each new frame. The wavelet scheme in this technique also allows a pyramid reproduction scheme which allows the technique to transmit low resolution frames when bandwidth requirements dictate and then increase the resolution for higher bandwidth applications.

Moreover, specific objects can be tracked through scenes with the optical flow technique. The file format shown in FIG. 9 can accommodate the image compression, pattern recognition, and video compression. For video compression, the values of $V_x$ and $V_y$ would be included for each domain and range blocks. Once video encoding starts, only those blocks that change can be transmitted, thus the wavelet coding and optical flow parts of the coding process can become background processes and thus not consume as much computational bandwidth on the video encoder processors.

Figure 14:
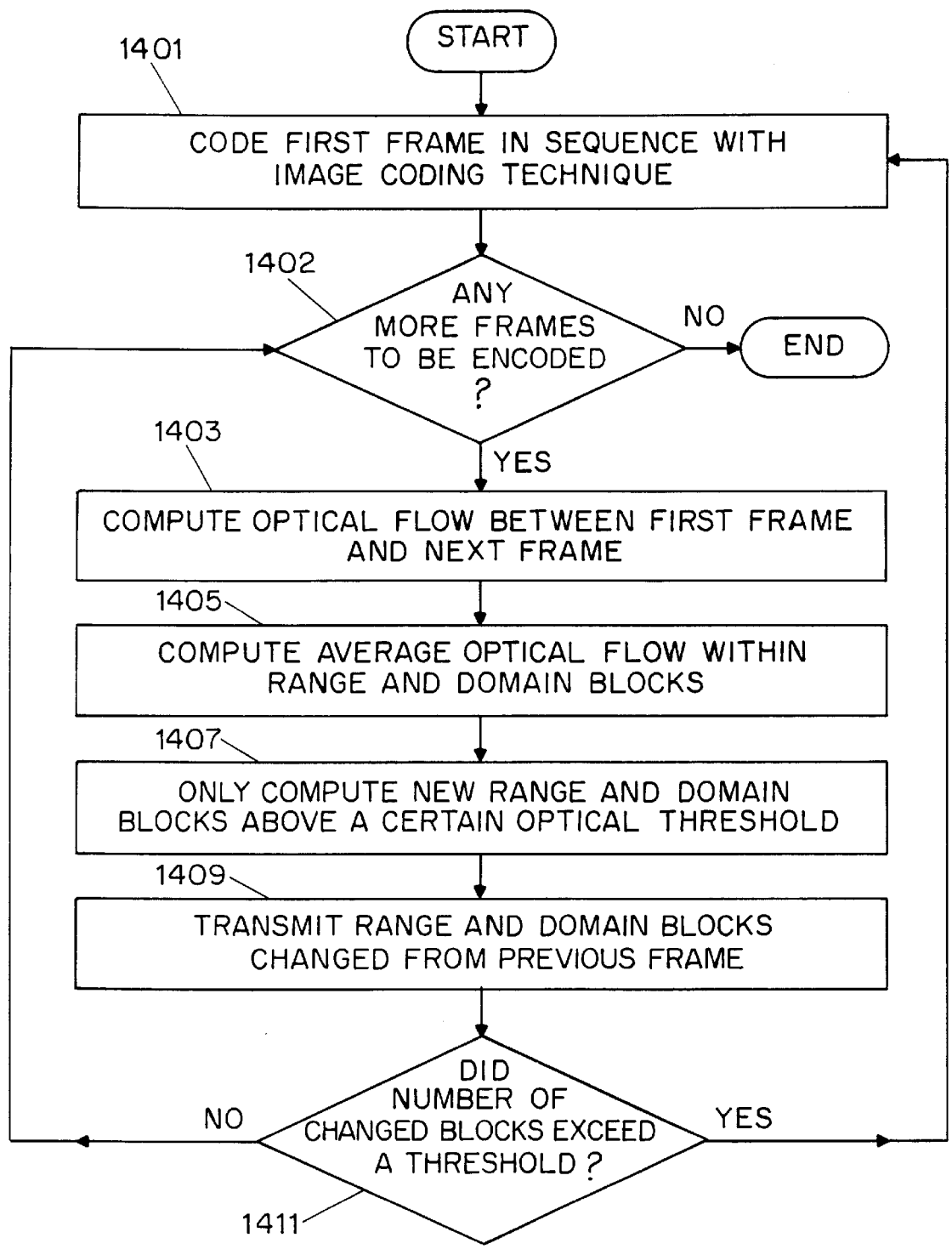
FIG. 14 is a flow chart of the steps used to encode video in accordance with the invention.

FIG. 14 shows a flow chart of the steps involved with the video encoding portion of the technique in accordance with the invention. Step 1401 codes the first frame in a sequence of frames with the image encoding technique described by FIG. 1. Video is made of a series of images which are projected in sequence to form the perceptions of movement. If the image is of a boy throwing a ball in a playground, each image in the series of images will have the ball slowly changing positions as the ball moves while the background may not change at all. Thus only a small portion of the images in a video may change frame to frame.

Step 1402 checks if any more frames are to be encoded. If more frames need to be encoded, the process continues with step 1403. If not, the video encoding processed is finished and the technique ends.

Step 1403 reads the next frame and computes the optical flow between the frame encoded in step 1401 and the frame just read. The optical flow will indicate any movement of the edges of an object between the frames. This step checks the optical flow over the entire image.

Step 1405 computes the average optical flow within each range and domain block which has image information which has changed between the two frames. The average optical flow in a block will enable the technique to determine if any significant change has occurred on the image on a block basis.

Step 1407 computes the new range and domain blocks which have an average optical flow calculated in step 1405 above a predefined level. If the average flow is below the threshold, the information has not changed sufficiently to make a visual impact. Therefore, the image file does not need to be changed at this time. If the optical flow is above the threshold, the affected range and domain blocks will be replaced with new range and domain blocks which reflect the change in the image. If an object is to be tracked, then all new range and domain blocks will be recorded in a separate file in order to store the complete motion of a particular object.

Step 1409 then transmits any range or domain blocks which have changed from the previous frame (and exceeded the predefined threshold in step 1407). Because all parts of an image frame does not change in every frame, only those particular range and domain blocks which did change will be transmitted to a video monitor or storage medium to show the localized motion. The block information will be transmitted beginning with the highest scale (lowest resolution) and increasing in resolution depending upon the available bandwidth of the transmission carrier.

Step 1411 checks if the number of range and domain block with a calculated optical flow which exceeded the threshold is above a second predefined level. If it is above the second level, then sufficient changes in the image field have occurred to warrant encoding the entire image field again instead of making partial charges. This will ensure that any noise in the smaller changer will not be compounded. If the threshold is exceeded, the technique goes back to step 1401. If the number of optical blocks which have changed is below the threshold, then the technique continues to process the next frame in smaller segments with step 1403. The video encoding ends when there are no more frames to process as checked in step 1402.

Figure 15:
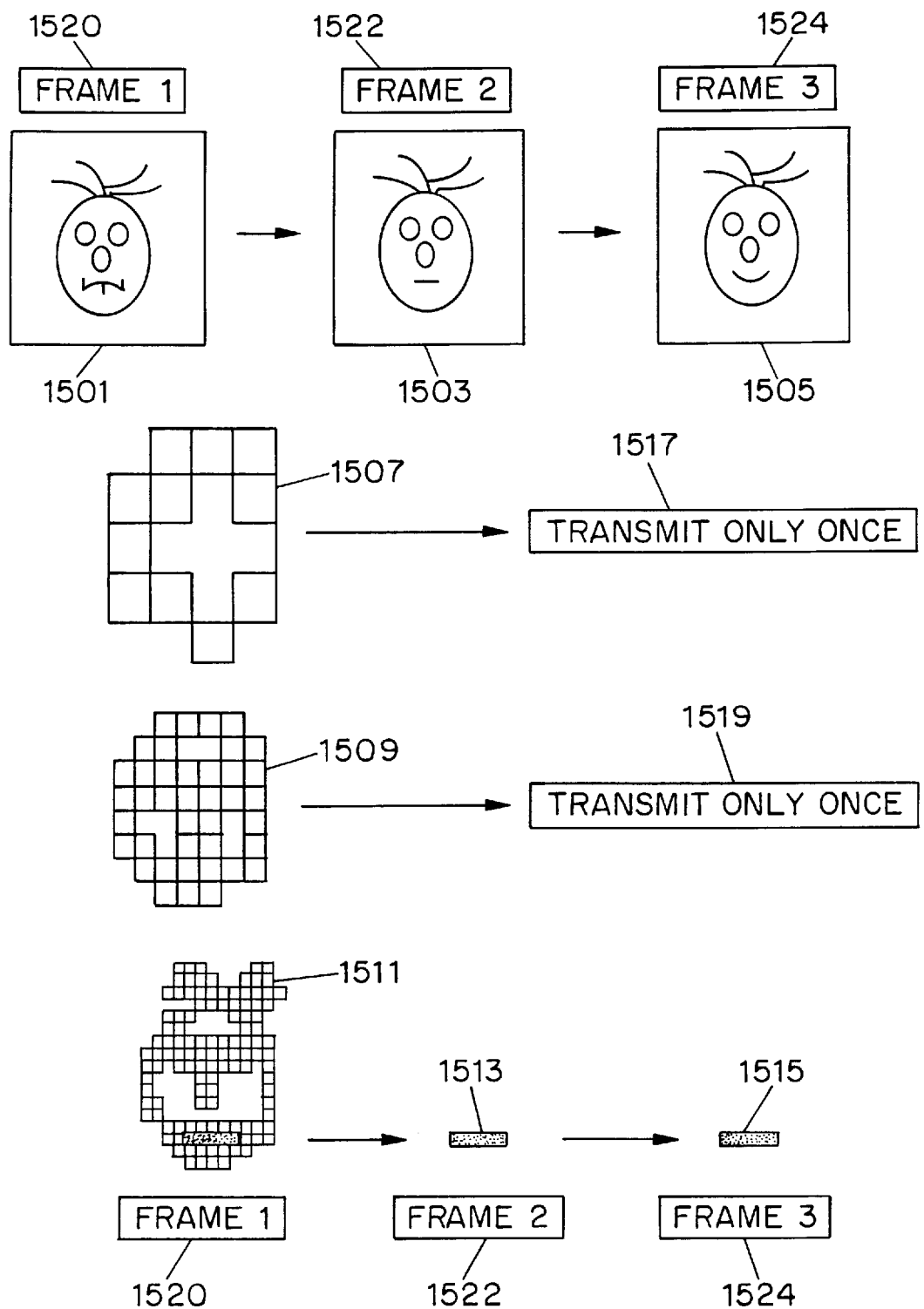
FIG. 15 is a graphical representation of performing the video encoding technique of FIG. 14 to an unencoded image.

FIG. 15 is a simplified graphical depiction of the video encoding technique described in FIG. 14. Labels 1520, 1522 and 1524 show the frame number. First frame 1501 of a video shows a face with eyes, nose, hair and a frowning mouth. Second frame 1503 shows the same face except the mouth is no longer frowning. Third frame 1505 shows the same face except for a smiling mouth. These images can be compressed and transmitted to a different location using the video coding technique of FIG. 14. In practice, there would be many more intermediate frames showing the changing shape of the mouth.

Image 1507 shows a representation of the face in frame 1501 compressed using the technique of FIG. 1 which is at a scale with the lowest resolution (high scale number). Labels 1517 and 1519 show the number of times the associated image is transmitted. In accordance with the technique described in FIG. 14, the entire low resolution image is transmitted only once for video frames 1501, 1503 and 1505 because the changes in the image are not substantial. Image 1509 shows a representation of the face image at a lower scale (medium resolution). Again, because the changes in the face were not substantial, the data describing image 1509 is transmitted only once. Image 1511 is a representation of the face image at the highest resolution (lowest scale). Only that portion of image 1511 which changes and has optical flow will be transmitted for each frame. The only portion of the image which will be transmitted is data for those range and domain blocks encoding the mouth of the face. Thus for frame 1503 and 1505, only the domain and range blocks correspond to the mouth of the highest resolution image will be transmitted. Transmitting only the changing features of the image saves significant transmission costs and allows video consisting of many frames to be processed.

Figure 16:
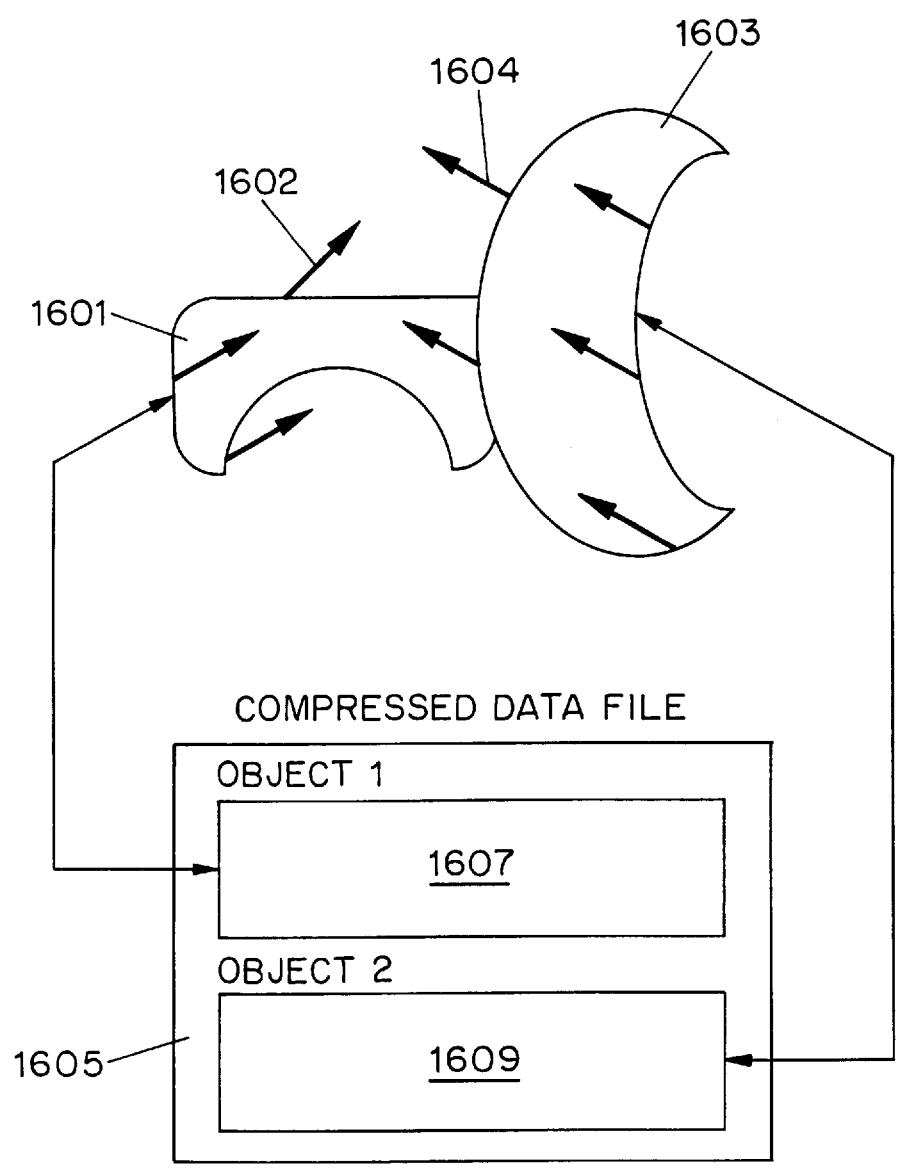
FIG. 16 is a graphical representation of multiple object tracking which is performed in accordance with the invention.

FIG. 16 is a graphical depiction of multiple objects which are being visually tracked. A real life example of tracking objects is tracking two airplanes in the sky. The tracking portion of the video encoding technique corresponds to step 1407 in FIG. 14. First object 1601 is moving in the direction indicated by arrow 1602. Second object 1603 is moving in a direction corresponding to arrow 1604. As each object moves, the optical flow of the objects change. The optical flow of each object which appears in the image field is stored in a file 1605. The optical flow characteristics of object 1601 are stored for each range and domain block of the object in file portion 1607 and the optical flow characteristics of object 1603 are stored for each range and domain block at the object in file portion 1609. The format of the files is shown the right hand columns entitled "Flow $V_x$" 971 and "Flow $V_y$" 981 of FIG. 9.

Figure 17:
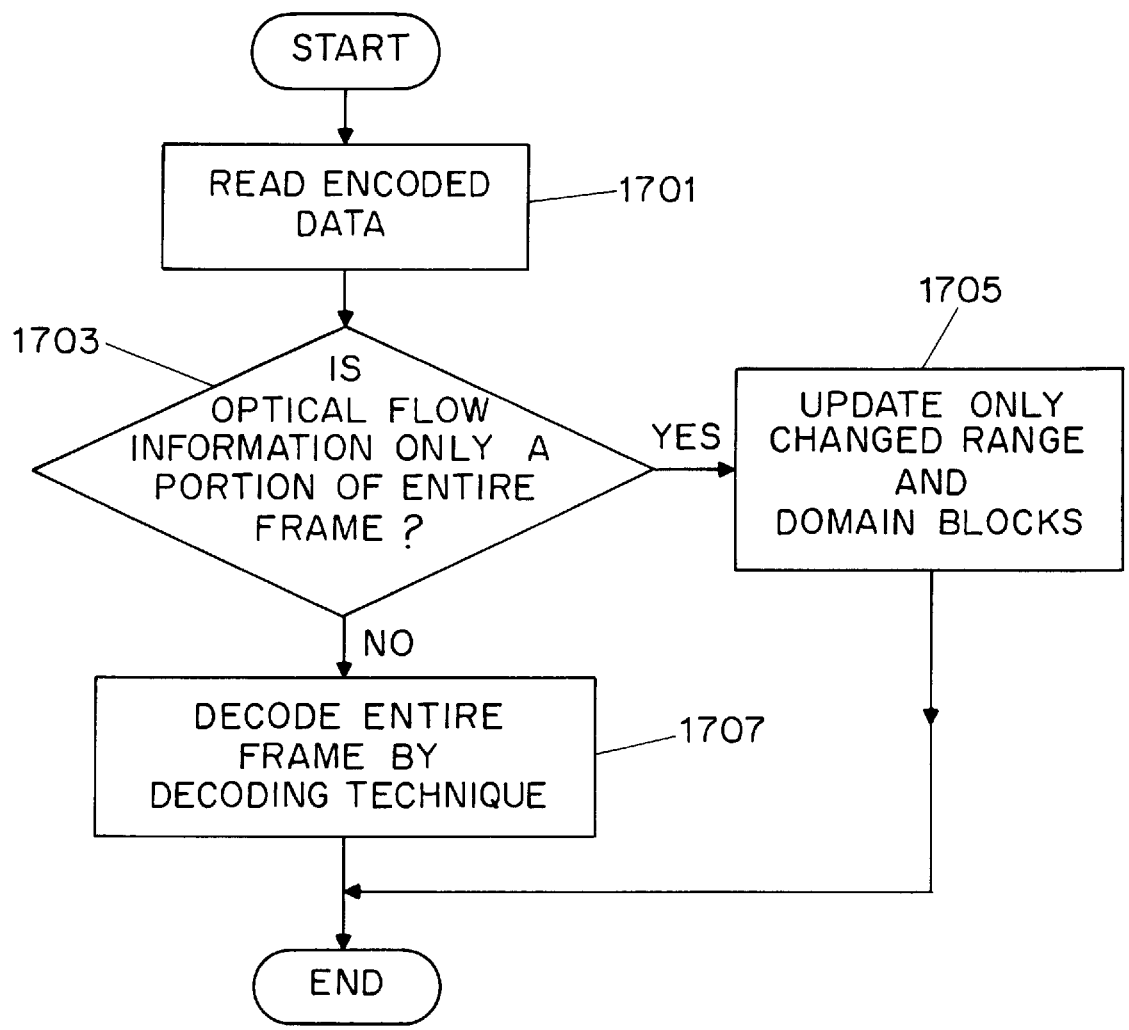
FIG. 17 is a flow chart of the steps used for decoding video in accordance with the invention.

FIG. 17 is a flow chart of the steps for decoding video images which have been encoded using the steps of FIG. 14. Step 1701 reads the encoded data for each frame which has been transmitted or previously stored. Step 1703 checks if the data is optical flow information from only a portion of the frame for the entire frame. This can be determined from either a predetermined bit value or the size of the data be processed. If the data is only from a portion of the image, then the process continues with step 1705. If the data is an encoded entire frame, the process continues with step 1707.

Step 1705 updates only changes domain and range blocks and decodes the images with this new information. Thus in the example if FIG. 15, only the domain and range blocks encompassing the mouth of the face would be transmitted and changed in the currently displayed image. The resolution of the decoded frame would depend on the system bandwidth which defines how many image scales can be transmitted and processed.

Step 1707 occurs when an entire frame is encoded using the technique described in FIG. 1. The technique for decoding an entire image described in FIG. 7 can be used in this instance. An entire frame is encoded when the amount of optical flow information for a given frame exceeds a selected threshold (see step 1411 of FIG. 14). The video decoding continues for each encoded from transmitted or being processed.

Figure 18:
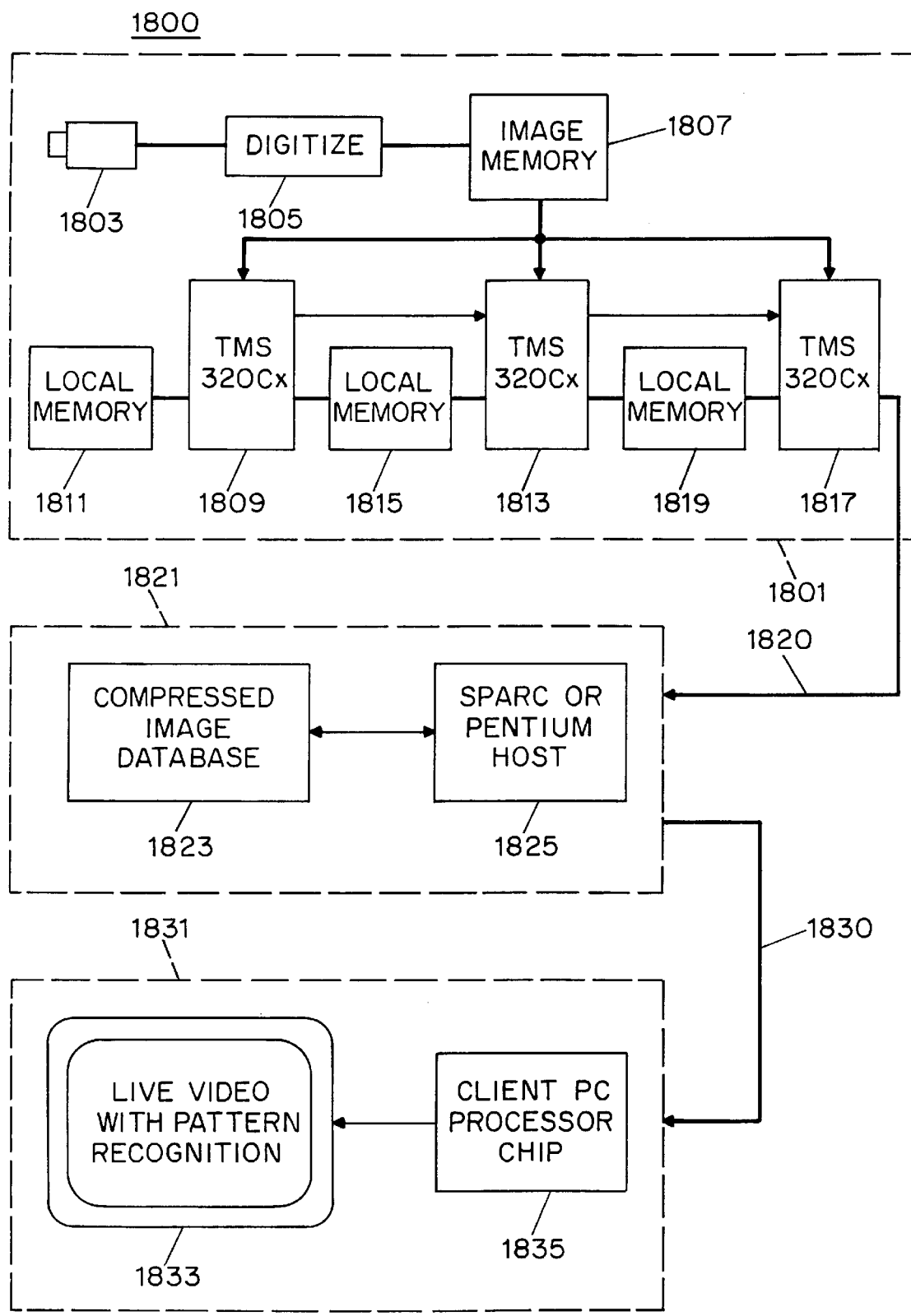
FIG. 18 is a graphical representation of a system upon which the technique of the invention can be performed.

FIG. 18 shows a system 1800 in which the present invention can be implemented. System 1800 contains three portions, video and image encoding portion 1801, pattern recognition portion 1821 and video decoding portion 1831. Video and image portion 1801 preferably includes a camera 1803, a digitizer 1805, image memory 1807, and three specialized processes 1809, 1813 and 1817 each which have a respective local memory 1811, 1815 and 1819. A microprocessor (not shown) for running a series of instructions and distributing data among the three processors is also included. The component are connected by conventional connectors and data buses.

Camera 1803 may be a video camera if video encoding is required or could be a still camera if only a single image encoding is required. However, a video camera could also be used to encode a single image representing either a single frame or series of unchanging frames. The camera could be within the housing of the be a remote could be a remote camera connected by a connector or transmission equipment.

Camera 1803 is connected to digitizer 1805 which forms a digital representation of the image. The representation will be made up of a number of pixels, the number depending upon the specific equipment used. The digitizer 1805 is connected to image memory 1807 which stores the image data for each frame captured by the camera 1803. The microprocessor (not shown) in the video and image portion 1801 is connected to all the components either through common connectors or a databus in a conventional manner.

Video encoding portion 1801 shows three special processors 1809, 1813, and 1817. These processors are preferably dedicated to specific tasks to gain the advantages of parallel and pipeline processing. Processor 1809 is preferable dedicated to performing the wavelet transformations on image data. Processor 1813 is preferably dedicated to computing the optical flow from one frame to the next. Processor 1817 is preferably dedicating to matching range and domain blocks in the fractal part of the encoding technique. The results of the encode image or video frame are sent via databus 1820. The databus, for example, could be a PCI, VME or similar high-bandwidth bus to suit different configurations. While three special processors are described, the present invention can be implemented on any number of processors.

Pattern recognition portion 1821 includes a compressed image database and a separate microprocessor for performing the matching techniques. Pattern recognition portion 1821 could be located in the same casing as video encoding portion 1801. Bus 1820 is connected to pattern recognition portion 1821. The compressed image database 1823 contains all the images and objects in their compressed form encoded in accordance with the present invention which are use to identify an object in a new image. The database 1823 can be large and can be stored on such storage mediums as magnetic tapes, CD-ROMs, or any other storage medium for large amounts of information. The processor 1825 will perform the matching technique described in FIG. 10 including performing the Lipschitz computations on the image to be identified.

The results of the pattern matching will be sent via network 1830 to video decoding portion 1831. Video decoding portion 1831 could be located in the same casing as either the video encoding portion 1801, the pattern recognition portion 1801 or both. Video decoding portion 1831 includes a video monitor 1833 and a separate processor 1835 with other necessary components for performing the video decoding and other functions. Monitor 1833 allows a user of the system to see the video (or image of a single frame) as it is decoded with any information from the pattern recognition portion about the image. Thus if a user is watching a busy highway and has stored the image data for all the models of the cars in the world, when a car image is recorded by camera 1803, the image will appear on monitor 1833 with a written description about the type of car after a pattern recognition operation has been performed in portion 1821. Processor 1835 performs the decoding operation and other necessary processes.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention as defined by its claims.

We claim:

1. A method for processing digital image data comprising the steps of:

spatially decomposing said image data into frequency scales of decreasing frequencies;

forming edge point representations at each of said frequency scale, including a lowest frequency scale;

dividing each said point representations of each of said frequency scales into blocks;

computing the normalized average modulus and angle values of each of said blocks;

matching said average modulus and angle values from said blocks of each of said frequency scales, except said lowest frequency scale, to said blocks of said next lower frequency scale;

storing information describing said matching blocks; and storing a spatially decimated representation at said lowest frequency scale.

2. The method of claim 1, wherein during said matching step, said blocks of said frequency scale being matched are range blocks and said blocks of said next higher scale are domain blocks.

3. The method of claim 1, wherein said spatially decomposing step uses a combined wavelet and gradient transformation function to perform said step.

4. The method of claim 3, wherein said wavelet transformation function is based on a quadratic spline basis set.

5. The method of claim 1, wherein said representations at each frequency scale includes high frequency representation and a low frequency representation.

6. The method of claim 5, wherein said matching step is only performed on said high frequency representations.

7. The method of claim 5, wherein said representation at said spatially decimated lowest frequency scale is a low frequency representation.

8. The method of claim 5 further comprising the steps of:

chain coding said high frequency representations in each of said frequency scales to indicate an object;

matching features of said object across said frequency scales;

preserving only those said matched features which satisfy a predetermined condition; and identifying said preserved features using other stored features.

9. The method of claim 8, wherein said matching step is performed using a Lipschitz equation.

10. The method of claim 8, wherein a Lipschitz equation is used in said matching step to remove noise from said encoded image.

11. The method of claim 8, wherein said predetermined condition in said preserving step is based on a Lipschitz equation.

12. The method of claim 8, wherein said predetermined condition in said preserving step is based on modulus values associated with said image data.

13. The method of claim 8, wherein said identifying step is performed using a range block centroid matching scheme.

14. The method of claim 1, wherein said matching steps includes sorting said average modulus values to increase matching efficiencies.

15. The method of claim 1, wherein said matching steps includes sorting said average angle values to increase matching efficiencies.

16. The method of claim 1, wherein said spatially decomposing step compresses said image data.

17. The method of claim 1, wherein said edge point representations are formed comprising the step of calculating the derivative of a transformation function.

18. A method for compressing digital image data combining wavelet and block encoding techniques comprising the steps of:

spatially decomposing said image into frequency scales of decreasing frequencies;

matching domain and range blocks representing said image from each said frequency scales except said lowest frequency scale, to said blocks of said next lower frequency scale using the normalized average modulus and angle values of each said block; and storing information describing said matched domain and range blocks for each said scale.

19. The method of claim 18, wherein said spatially decomposing step uses a wavelet transformation function to perform said step.

20. The method of claim 19, wherein said wavelet transformation function is based on a quadratic spline basis set.

21. The method of claim 18, wherein each said frequency scale includes high frequency components of said image data.

22. The method of claim 21, wherein said matching step is performed on said high frequency components.

23. The method of claim 18, wherein said matching step includes sorting said average modulus values to increase matching efficiencies.

24. The method of claim 18, wherein said matching step includes sorting said average angle values to increase matching efficiencies.

25. The method of claim 18, wherein said spatially decompressing step comprises the step of calculating the derivative of a transformation function.

26. A method for processing compressed digital image data representing an original image, wherein said image data has been spatially decomposed into a plurality of frequency scales each having a low frequency representation and high frequency point representation and wherein said high frequency point representations were encoded at least by matching average modulus and angle values of portions of said high frequency point representations between adjacent said frequency scales, the method comprising the steps of:

a. decoding said encoded representation in said lowest frequency scale;

b. decoding a high frequency point representation at each of said frequency scales;

c. transforming said decoded low and high frequency representations for each of said frequency scales into a corresponding representation in the next higher frequency scale;

d. adding said transformed low frequency image and said transformed high frequency image to produce a new low frequency image at the next highest scale; and e. repeating steps c and d until said new low frequency image closely approximates said original image.

27. The method of claim 26, wherein said coded high frequency representations include chain coded data and said decoding step b includes a synthetic edge procedure.

28. The method of claim 26, wherein said decoding step a is accomplished with fractal techniques.

29. The method of claim 26, further including the step of comparing image information to a threshold in order to remove said information from said image.

30. The method of claim 26, wherein said high frequency point representations include chain coded data and said decoding step b uses said chain coded data.

31. The method of claim 26, wherein said point representations include blocks and said decode step b uses an average modulus value for decoding.

32. The method of claim 26, wherein said point representations include blocks and said decode step b uses an average angle value for decoding.

33. A system for processing digital image data comprising:

an image recorder for recording an image;

a digitizer for converting said recorded image as said image data;

at least one first processor which spatially decomposes said image data into frequency scales of decreasing frequencies, forms edge point representations at each said frequency scale, including a lowest frequency scale, for dividing said point representations of each said frequency scales into blocks, computes the average modulus and angle values of each of said blocks, matches said average modulus and angle values from said blocks of each of said frequency scales, except said lowest frequency scale, to said blocks of said next lower frequency scale;

a storage medium for storing information describing said matching blocks; and a monitor to display said image.

34. The system of claim 33, wherein said first processor calculates the derivative of a transformation function while forming edge point representations.

35. The system of claim 33, further comprising:

a storage medium containing a database of image data to be used for pattern matching;

at least one second processor for matching said information describing said matching blocks to said database.

36. The system of claim 33, wherein said first and second processors are the same processor.

37. The system of claim 33, further comprising a databus for connecting said storage medium and said second processor to said first processor.

38. The system of claim 37, further comprising a separate third processor for decoding said image data.

39. The system of claim 38, further comprising a databus for connecting said third processor to said first processor.

40. The system of claim 38, further comprising a network for connecting said third processor to said first processor.

* * * * *